US010060705B2

(12) United States Patent
Compton et al.

(10) Patent No.: US 10,060,705 B2
(45) Date of Patent: *Aug. 28, 2018

(54) APPARATUS AND METHOD FOR POWERING AND NETWORKING A RAIL OF A FIREARM

(71) Applicant: COLT CANADA IP HOLDING PARTNERSHIP, Kitchener, Ontario (CA)

(72) Inventors: David Walter Compton, Kitchener (CA); Gary Edward Crocker, Kitchener (CA)

(73) Assignee: COLT CANADA IP HOLDING PARTNERSHIP, Kitchener, Ontario (CA)

( * ) Notice: Subject to any disclaimer, the term of this patent is extended or adjusted under 35 U.S.C. 154(b) by 26 days.

This patent is subject to a terminal disclaimer.

(21) Appl. No.: 14/553,955

(22) Filed: Nov. 25, 2014

(65) Prior Publication Data
US 2016/0349012 A1 Dec. 1, 2016

Related U.S. Application Data

(60) Division of application No. 13/372,825, filed on Feb. 14, 2012, now Pat. No. 9,891,023, which is a
(Continued)

(51) Int. Cl.
*F41A 19/00* (2006.01)
*F41G 11/00* (2006.01)
(Continued)

(52) U.S. Cl.
CPC ............ *F41G 11/003* (2013.01); *H02J 7/025* (2013.01); *H02J 50/12* (2016.02); *H02J 50/40* (2016.02);
(Continued)

(58) Field of Classification Search
CPC ..... F41G 11/003; F41C 27/00; H04B 5/0031; H04B 5/0037; H04B 5/0081; H02J 5/0081
(Continued)

(56) References Cited

U.S. PATENT DOCUMENTS 1,950,835 A * 3/1934 Zajac ........................ F41G 1/35
362/114
4,533,980 A 8/1985 Hayes
(Continued)

FOREIGN PATENT DOCUMENTS

| CA | 2547081 | 6/2005 |
|----|---------|--------|
| CA | 2537839 | 9/2005 |

(Continued)

OTHER PUBLICATIONS

English Abstract of DE102004045753.
(Continued)

*Primary Examiner* — Michelle Clement
(74) *Attorney, Agent, or Firm* — Cantor Colburn LLP

(57) ABSTRACT

A method, apparatus and system for networking accessories to a firearm or weapon wherein the accessories are powered from the rail and data is transferred between the accessories and the rail. In one embodiment, a weapon is provided, the weapon having: an upper receiver; a lower receiver; a powered accessory mounted to a rail of the upper receiver; and an apparatus for networking a microcontroller of the powered accessory to a microcontroller of the upper receiver and a microcontroller of the lower receiver, wherein the data is exclusively provided to the powered accessory from one of a plurality of coils located within the rail; and wherein the powered accessory further comprises a plurality of coils and the powered accessory is configured to determine when one
(Continued)

of the plurality of coils of the powered accessory is adjacent to the one of the plurality of coils of the rail.

10 Claims, 21 Drawing Sheets

Related U.S. Application Data continuation-in-part of application No. 12/688,256, filed on Jan. 15, 2010, now Pat. No. 9,823,043.

(60) Provisional application No. 61/443,085, filed on Feb. 15, 2011, provisional application No. 61/528,728, filed on Aug. 29, 2011.

(51) Int. Cl.
  *H02J 50/70*  (2016.01)
  *H02J 7/02*  (2016.01)
  *H04B 5/00*  (2006.01)
  *H02J 50/80*  (2016.01)
  *H02J 50/12*  (2016.01)
  *H02J 50/40*  (2016.01)
  *H02J 5/00*  (2016.01)

(52) U.S. Cl.
  CPC .............. *H02J 50/70* (2016.02); *H02J 50/80* (2016.02); *H04B 5/0031* (2013.01); *H04B 5/0037* (2013.01); *H02J 5/005* (2013.01); *H04B 5/0081* (2013.01)

(58) Field of Classification Search
  USPC ................. 42/84, 94, 71.01, 72, 124
  See application file for complete search history.

(56) References Cited

U.S. PATENT DOCUMENTS

| | | |
|---|---|---|
| 5,033,219 A | 7/1991 | Johnson et al. |
| 5,142,806 A | 9/1992 | Swan |
| 5,237,773 A | 8/1993 | Claridge |
| 5,345,707 A | 9/1994 | Randall |
| 5,360,949 A | 11/1994 | Duxbury |
| 5,555,662 A | 9/1996 | Teetzel |
| 5,557,872 A | 9/1996 | Langner |
| 5,654,594 A | 8/1997 | Bjornsen, III et al. |
| 5,669,174 A | 9/1997 | Teetzel |
| 5,822,905 A | 10/1998 | Teetzel |
| 5,826,363 A | 10/1998 | Olson |
| 5,831,841 A | 11/1998 | Nishino |
| 6,163,131 A | 12/2000 | Gartstein et al. |
| 6,219,952 B1 * | 4/2001 | Mossberg .............. F41A 17/063 42/70.01 |
| 6,237,271 B1 | 5/2001 | Kaminski |
| 6,412,207 B1 | 7/2002 | Crye et al. |
| 6,430,861 B1 | 8/2002 | Ayers et al. |
| 6,490,822 B1 | 12/2002 | Swan |
| 6,499,245 B1 | 12/2002 | Swan |
| 6,508,027 B1 * | 1/2003 | Kim ...................... F41G 11/003 42/124 |
| 6,513,251 B2 * | 2/2003 | Huang ................... F41G 1/345 33/286 |
| 6,618,976 B1 | 9/2003 | Swan |
| 6,622,416 B2 | 9/2003 | Kim |
| 6,779,288 B1 * | 8/2004 | Kim ...................... F41G 11/003 42/124 |
| 6,792,711 B2 | 9/2004 | Battaglia |
| 6,847,587 B2 | 1/2005 | Patterson et al. |
| 6,849,811 B1 * | 2/2005 | Heflin ................... H01H 1/225 200/1 R |
| 6,854,206 B2 * | 2/2005 | Oz ........................ F41G 1/34 42/111 |
| 6,865,599 B2 | 3/2005 | Zhang |
| 6,895,708 B2 * | 5/2005 | Kim ...................... F41G 11/003 42/106 |
| 6,899,539 B1 | 5/2005 | Stallman et al. |
| 6,918,066 B2 | 7/2005 | Dutta et al. |
| 6,925,744 B2 | 8/2005 | Kincel |
| 6,931,775 B2 | 8/2005 | Burnett |
| 7,007,586 B2 | 3/2006 | Larroque-Lahitette et al. |
| 7,059,076 B2 | 6/2006 | Stoner et al. |
| 7,096,619 B2 | 8/2006 | Jackson et al. |
| 7,121,036 B1 | 10/2006 | Florence et al. |
| 7,124,531 B1 | 10/2006 | Florence et al. |
| 7,131,228 B2 | 11/2006 | Hochstrate |
| 7,144,830 B2 | 12/2006 | Hill et al. |
| RE39,465 E | 1/2007 | Swan |
| 7,216,451 B1 * | 5/2007 | Troy ....................... F41C 23/16 42/71.01 |
| 7,231,606 B2 | 6/2007 | Miller et al. |
| 7,243,454 B1 | 7/2007 | Cahill |
| D556,289 S * | 11/2007 | Yu .................... D22/108 |
| 7,316,003 B1 | 1/2008 | Dulepet et al. |
| RE40,216 E | 4/2008 | Swan |
| 7,363,741 B2 * | 4/2008 | DeSomma .............. F41C 23/16 42/124 |
| 7,421,817 B2 | 9/2008 | Larsson |
| 7,421,818 B2 | 9/2008 | Houde-Walter |
| 7,438,430 B2 | 10/2008 | Kim |
| 7,458,179 B2 | 12/2008 | Swan |
| 7,461,346 B2 | 12/2008 | Fildebrandt |
| 7,464,495 B2 | 12/2008 | Cahill |
| 7,523,580 B1 * | 4/2009 | Tankersley .............. F41C 23/16 42/71.01 |
| 7,525,203 B1 | 4/2009 | Racho |
| 7,548,697 B2 | 6/2009 | Hudson et al. |
| 7,551,121 B1 | 6/2009 | O'Connell et al. |
| 7,554,316 B2 | 6/2009 | Stevens et al. |
| 7,559,169 B2 | 7/2009 | Hung et al. |
| 7,562,483 B2 | 7/2009 | Hines |
| 7,584,569 B2 | 9/2009 | Kallio et al. |
| 7,605,496 B2 | 10/2009 | Stevens et al. |
| 7,627,975 B1 | 12/2009 | Hines |
| 7,640,690 B2 | 1/2010 | Hines |
| 7,676,975 B2 | 3/2010 | Phillips et al. |
| 7,698,983 B1 | 4/2010 | Pinto et al. |
| D616,521 S * | 5/2010 | Starnes .................. D22/108 |
| 7,707,762 B1 | 5/2010 | Swan |
| 7,712,241 B2 | 5/2010 | Teetzel et al. |
| 7,750,814 B2 | 7/2010 | Fisher et al. |
| 7,775,150 B2 | 8/2010 | Hochstrate |
| 7,793,452 B1 * | 9/2010 | Samson ................. F41C 23/16 42/71.01 |
| 7,818,910 B2 | 10/2010 | Young |
| 7,841,120 B2 | 11/2010 | Teetzel et al. |
| 7,866,083 B2 | 1/2011 | Teetzel |
| 7,868,587 B2 | 1/2011 | Stevens et al. |
| 7,908,784 B2 | 3/2011 | Kim |
| 7,909,490 B2 | 3/2011 | Chou et al. |
| 7,953,369 B2 | 5/2011 | Baarman |
| 7,954,971 B1 * | 6/2011 | Kincaid .................... F41G 1/35 362/110 |
| 7,975,419 B2 | 7/2011 | Darian |
| 7,985,527 B2 | 7/2011 | Tokunaga |
| 7,990,147 B2 | 8/2011 | Driemel et al. |
| 7,994,752 B2 * | 8/2011 | Soar ........................ B60N 2/44 307/104 |
| 8,001,715 B2 | 8/2011 | Stokes |
| 8,005,995 B2 | 8/2011 | Ito et al. |
| 8,028,459 B2 | 10/2011 | Williams |
| 8,028,460 B2 | 10/2011 | Williams |
| 8,035,340 B2 | 10/2011 | Stevens et al. |
| 8,039,995 B2 | 10/2011 | Stevens et al. |
| 8,042,967 B2 | 10/2011 | Hikmet et al. |
| 8,063,773 B2 | 11/2011 | Fisher |
| 8,091,265 B1 | 1/2012 | Teetzel et al. |
| 8,104,211 B2 | 1/2012 | Darian |
| 8,141,288 B2 | 3/2012 | Dodd et al. |
| 8,146,282 B2 | 4/2012 | Cabahug et al. |
| 8,151,505 B2 | 4/2012 | Thompson |
| 8,225,542 B2 | 7/2012 | Houde-Walter |
| 8,251,288 B2 | 8/2012 | Woitalla et al. |

(56) References Cited

U.S. PATENT DOCUMENTS

| | | |
|---|---|---|
| 8,311,757 B2 | 11/2012 | Lin |
| 8,336,776 B2 | 12/2012 | Horvath et al. |
| 8,347,541 B1 | 1/2013 | Thompson |
| 8,371,729 B2 | 2/2013 | Sharrah et al. |
| 8,453,369 B1* | 6/2013 | Kincaid .................. F41G 1/35 403/322.1 |
| 8,458,944 B2 | 6/2013 | Houde-Walter |
| 8,464,459 B1 | 6/2013 | Summers |
| 8,485,085 B2 | 7/2013 | Goree et al. |
| 8,495,945 B1 | 7/2013 | Kirchner et al. |
| 8,516,731 B2 | 8/2013 | Cabahug et al. |
| 8,528,244 B2 | 9/2013 | Scallie et al. |
| 8,572,292 B2 | 10/2013 | Ito et al. |
| 8,635,798 B2 | 1/2014 | Mulfinger |
| 8,668,496 B2 | 3/2014 | Nolen |
| 8,739,672 B1 | 6/2014 | Kelly |
| 8,826,575 B2 | 9/2014 | Ufer et al. |
| 9,010,002 B2 | 4/2015 | Popa-Simil |
| 9,151,564 B1 | 10/2015 | Baxter |
| 2002/0174588 A1 | 11/2002 | Danner et al. |
| 2003/0029072 A1 | 2/2003 | Danielson et al. |
| 2003/0074822 A1* | 4/2003 | Faifer ..................... F41C 23/16 42/71.01 |
| 2003/0106251 A1* | 6/2003 | Kim ....................... F41G 11/003 42/71.01 |
| 2004/0121292 A1 | 6/2004 | Chung et al. |
| 2004/0198336 A1 | 10/2004 | Jancic et al. |
| 2005/0000142 A1* | 1/2005 | Kim ....................... F41G 11/003 42/124 |
| 2005/0018041 A1 | 1/2005 | Towery et al. |
| 2005/0033544 A1* | 2/2005 | Brooks ................... G01R 33/02 702/128 |
| 2005/0109201 A1 | 5/2005 | Larroque-Lahitette et al. |
| 2005/0204603 A1 | 9/2005 | Larsson |
| 2005/0217161 A1* | 10/2005 | Haugen ................... F41C 27/00 42/124 |
| 2005/0241206 A1 | 11/2005 | Teetzel et al. |
| 2005/0241211 A1 | 11/2005 | Swan |
| 2005/0268521 A1 | 12/2005 | Cox et al. |
| 2006/0005447 A1 | 1/2006 | Lenner et al. |
| 2006/0204935 A1 | 9/2006 | McAfee et al. |
| 2006/0288626 A1 | 12/2006 | Kim |
| 2007/0006509 A1* | 1/2007 | DeSomma ............ F41G 11/003 42/72 |
| 2007/0150556 A1 | 6/2007 | Fukuda et al. |
| 2007/0216392 A1 | 9/2007 | Stevens et al. |
| 2007/0228833 A1 | 10/2007 | Stevens et al. |
| 2008/0010890 A1 | 1/2008 | Vice et al. |
| 2008/0039962 A1 | 2/2008 | McRae |
| 2008/0040965 A1 | 2/2008 | Solinsky et al. |
| 2008/0063400 A1 | 3/2008 | Hudson et al. |
| 2008/0092422 A1* | 4/2008 | Daniel .................... F41C 23/16 42/90 |
| 2008/0108021 A1 | 5/2008 | Slayton et al. |
| 2008/0134562 A1 | 6/2008 | Teetzel |
| 2008/0170838 A1 | 7/2008 | Teetzel et al. |
| 2008/0190002 A1 | 8/2008 | Hines |
| 2008/0216380 A1* | 9/2008 | Teetzel .................. F41G 11/003 42/127 |
| 2008/0219100 A1 | 9/2008 | Fisher et al. |
| 2008/0301994 A1* | 12/2008 | Langevin ............... F41C 23/16 42/71.01 |
| 2009/0044439 A1 | 2/2009 | Phillips et al. |
| 2009/0058361 A1* | 3/2009 | John ..................... A61N 1/3785 320/128 |
| 2009/0108589 A1 | 4/2009 | Racho et al. |
| 2009/0134713 A1 | 5/2009 | Stevens et al. |
| 2009/0218884 A1* | 9/2009 | Soar ....................... F41H 1/02 307/11 |
| 2009/0249216 A1 | 10/2009 | Charka et al. |
| 2009/0255160 A1 | 10/2009 | Summers et al. |
| 2009/0305197 A1 | 12/2009 | Lim et al. |
| 2009/0322158 A1 | 12/2009 | Stevens et al. |
| 2010/0031552 A1 | 2/2010 | Houde-Walter et al. |
| 2010/0083553 A1 | 4/2010 | Montgomery et al. |
| 2010/0095574 A1 | 4/2010 | Abst et al. |
| 2010/0122485 A1* | 5/2010 | Kincel .................... F41G 11/004 42/146 |
| 2010/0126054 A1* | 5/2010 | Daniel .................... F41C 23/16 42/71.01 |
| 2010/0154276 A1 | 6/2010 | Kim |
| 2010/0154280 A1* | 6/2010 | LaFrance .............. F41G 11/001 42/124 |
| 2010/0175293 A1* | 7/2010 | Hines ..................... F41C 23/16 42/71.01 |
| 2010/0180485 A1 | 7/2010 | Cabahug et al. |
| 2010/0181933 A1 | 7/2010 | Langovsky et al. |
| 2010/0186278 A1* | 7/2010 | Daniel .................... F41C 23/16 42/71.01 |
| 2010/0192443 A1 | 8/2010 | Cabahug et al. |
| 2010/0192444 A1 | 8/2010 | Cabahug et al. |
| 2010/0192446 A1 | 8/2010 | Darian |
| 2010/0192447 A1 | 8/2010 | Cabahug et al. |
| 2010/0192448 A1 | 8/2010 | Darian et al. |
| 2010/0218410 A1 | 9/2010 | Cabahug et al. |
| 2010/0229448 A1 | 9/2010 | Houde-Walter et al. |
| 2010/0242332 A1 | 9/2010 | Teetzel et al. |
| 2010/0275489 A1 | 11/2010 | Cabahug et al. |
| 2010/0279544 A1 | 11/2010 | Dodd et al. |
| 2010/0281725 A1* | 11/2010 | Arbouw .................. F41A 9/62 42/1.02 |
| 2011/0000120 A1 | 1/2011 | Thompson et al. |
| 2011/0006613 A1 | 1/2011 | Stevens et al. |
| 2011/0010979 A1 | 1/2011 | Houde-Walter et al. |
| 2011/0030257 A1 | 2/2011 | Gwillim, Jr. et al. |
| 2011/0031928 A1* | 2/2011 | Soar ....................... F41G 1/34 320/108 |
| 2011/0036337 A1 | 2/2011 | Freitag et al. |
| 2011/0061284 A1 | 3/2011 | Cabahug et al. |
| 2011/0089894 A1* | 4/2011 | Soar ....................... B60N 2/44 320/108 |
| 2011/0099876 A1 | 5/2011 | Bentley |
| 2011/0126622 A1 | 6/2011 | Turner |
| 2011/0131858 A1 | 6/2011 | Darian et al. |
| 2011/0162245 A1 | 7/2011 | Kamal et al. |
| 2011/0162251 A1 | 7/2011 | Houde-Walter |
| 2011/0173865 A1 | 7/2011 | Compton et al. |
| 2011/0214328 A1 | 9/2011 | Williams et al. |
| 2011/0239354 A1 | 10/2011 | Celona et al. |
| 2011/0252741 A1 | 10/2011 | Travez et al. |
| 2011/0264257 A1 | 10/2011 | Travez et al. |
| 2011/0271822 A1 | 11/2011 | Myr |
| 2011/0283585 A1 | 11/2011 | Cabahug et al. |
| 2011/0283586 A1 | 11/2011 | Scallie et al. |
| 2011/0285214 A1 | 11/2011 | Stevens et al. |
| 2011/0306251 A1 | 12/2011 | Mulfinger et al. |
| 2012/0021385 A1 | 1/2012 | Belenkii et al. |
| 2012/0068536 A1 | 3/2012 | Stevens et al. |
| 2012/0085331 A1 | 4/2012 | Lang et al. |
| 2012/0097741 A1 | 4/2012 | Karcher |
| 2012/0125092 A1 | 5/2012 | Downing |
| 2012/0125189 A1 | 5/2012 | McLean, III et al. |
| 2012/0131837 A1 | 5/2012 | Cabahug et al. |
| 2012/0143368 A1 | 6/2012 | Travez et al. |
| 2012/0144714 A1 | 6/2012 | Cabahug et al. |
| 2012/0144716 A1 | 6/2012 | Cabahug et al. |
| 2012/0180363 A1 | 7/2012 | Frascati et al. |
| 2012/0180364 A1 | 7/2012 | Berntsen et al. |
| 2012/0192476 A1 | 8/2012 | Compton et al. |
| 2012/0214137 A1 | 8/2012 | Goree et al. |
| 2012/0233901 A1 | 9/2012 | Kim et al. |
| 2012/0285064 A1 | 11/2012 | Houde-Walter et al. |
| 2013/0047482 A1 | 2/2013 | Mulfinger et al. |
| 2013/0047486 A1 | 2/2013 | Ding et al. |
| 2013/0061504 A1 | 3/2013 | Malherbe et al. |
| 2013/0061509 A1 | 3/2013 | Allen et al. |
| 2013/0104438 A1 | 5/2013 | Hines et al. |
| 2013/0104439 A1 | 5/2013 | Hines et al. |
| 2013/0105579 A1 | 5/2013 | Miller |
| 2013/0185978 A1 | 7/2013 | Dodd et al. |
| 2013/0286239 A1 | 10/2013 | Lupher et al. |
| 2013/0329211 A1 | 12/2013 | McHale et al. |

(56) References Cited

U.S. PATENT DOCUMENTS

| | | | |
|---|---|---|---|
| 2013/0337415 A1 | 12/2013 | Huet | |
| 2013/0344461 A1 | 12/2013 | Tello | |
| 2014/0007485 A1* | 1/2014 | Castejon, Sr. | F41G 1/35 42/117 |
| 2014/0028856 A1 | 1/2014 | Ehrlich | |
| 2014/0047754 A1 | 2/2014 | Compton et al. | |
| 2014/0052578 A1 | 2/2014 | Redwood | |
| 2014/0052878 A1 | 2/2014 | Ito et al. | |
| 2014/0059911 A1 | 3/2014 | Oh et al. | |
| 2014/0068990 A1 | 3/2014 | Cabahug et al. | |
| 2014/0130392 A1 | 5/2014 | Oh et al. | |
| 2014/0184476 A1 | 7/2014 | McHale et al. | |
| 2014/0360081 A1 | 12/2014 | Lupher et al. | |
| 2014/0378088 A1 | 12/2014 | Goel et al. | |
| 2015/0020427 A1* | 1/2015 | Compton | F41C 27/00 42/71.01 |
| 2015/0026588 A1 | 1/2015 | Turcotte et al. | |
| 2015/0041538 A1 | 2/2015 | Teetzel et al. | |
| 2015/0108215 A1 | 4/2015 | Ehrlich | |
| 2015/0176949 A1 | 6/2015 | Varshneya | |
| 2015/0285593 A1 | 10/2015 | Dribben | |
| 2015/0285599 A1 | 10/2015 | Downing | |
| 2015/0300786 A1 | 10/2015 | Downing et al. | |
| 2015/0345887 A1 | 12/2015 | Shneorson et al. | |
| 2015/0345906 A1 | 12/2015 | Varshneya et al. | |
| 2015/0369554 A1 | 12/2015 | Kramer | |
| 2016/0025462 A1 | 1/2016 | Downing | |
| 2016/0254462 A1 | 1/2016 | Downing et al. | |
| 2016/0033221 A1 | 2/2016 | Schmehl et al. | |
| 2016/0084617 A1 | 3/2016 | Lyren | |
| 2016/0169627 A1 | 6/2016 | Northrup | |
| 2016/0216082 A1 | 7/2016 | Downing | |
| 2016/0223278 A1 | 8/2016 | Schechter | |
| 2016/0316128 A1 | 10/2016 | Teich | |

FOREIGN PATENT DOCUMENTS

| | | |
|---|---|---|
| CA | 2756018 | 9/2010 |
| CA | 2754852 | 11/2010 |
| CA | 2754869 | 11/2010 |
| CA | 2923506 | 3/2015 |
| DE | 2251670 A1 | 5/1974 |
| DE | 102004045753 | 3/2006 |
| EP | 2587659 A1 | 5/2013 |
| TW | 200715159 A | 4/2007 |
| WO | 2005080908 A2 | 9/2005 |
| WO | 2005109597 A1 | 11/2005 |
| WO | 2008048116 A1 | 4/2008 |
| WO | 2008108818 A2 | 9/2008 |
| WO | 2009127354 A2 | 10/2009 |
| WO | 2009151713 A2 | 12/2009 |
| WO | 2010004470 | 1/2010 |
| WO | 2010107324 A1 | 9/2010 |
| WO | 2011079233 A2 | 6/2011 |
| WO | 2011162245 A1 | 12/2011 |
| WO | 2013066472 | 5/2013 |
| WO | 2013112242 | 8/2013 |
| WO | 2013120015 A1 | 8/2013 |
| WO | 2014026274 A1 | 2/2014 |

OTHER PUBLICATIONS

International Preliminary Report on Patentability of the International Searching Authority, or the Declaration for PCT/CA2012/050080; dated Aug. 29, 2013, 6 pages.
International Search Report and the Written Opinion of the International Searching Authority, or the Declaration; for PCT/CA2012/005080; dated May 16, 2012, 13 pages.
International Search Report and the Written Opinion of the International Searching Authority, or the Declaration; for PCT/CA2014/050837; dated Oct. 27, 2014, 20 Pages.
International Search Report and the Written Opinion of the International Searching Authority, or the Declaration; for PCT/CA2014/050854; dated Nov. 6, 2014, 8 Pages.
International Search Report and the Written Opinion of the International Searching Authority, or the Declaration; for PCT/CA2010/000039 dated Oct. 15, 2010, 9 Pages.
Corrected International Search Report and the Written Opinion of the International Searching Authority, or the Declaration; for PCT/CA2012/050080; dated Jun. 4, 2012, 16 pages.
International Search Report and the Written Opinion of the International Searching Authority, or the Declaration; for PCT/CA2013/050598; dated Nov. 8, 2013, 13 Pages.
International Preliminary Report on Patentability of the International Searching Authority, or the Declaration for PCT/CA2013/050598; dated Sep. 4, 2014, 52 pages.
Machine Translation of claims of DE102004045753.
Machine Translation of Specification of DE102004045753.
Notification of Transmittal of the International Search Report and the Written Opinion of the International Searching Authority, or the Declaration; PCT/CA2014/051006; dated Dec. 23, 2014, 9 Pages.
Singapore Search Report dated Oct. 15, 2013 for Application No. 201205195-9, 18 Pages.
Extended European Search Report for EP Application No. 16162291.5.
ISR/WO, dated Jul. 21, 2016, International Search Report for International Application No. PCT/CA2016/050591; dated Jul. 21, 2016
Written Opinion for International Application No. PCT/CA2016/050591; International Filing Date: May 26, 2016; dated Jul. 21, 2016; 6 pgs.
Australian Office Action for Application No. 2012218790; dated Feb. 9, 2016; 3 pgs.
English Abstract for DE2251670A1—May 2, 1974; 1 pg.
English Abstract for WO2011062245A1—Dec. 29, 2011; 2 pgs.
Also related to cited reference EP2587659A1—May 1, 2013.
European Office Action for Application No. 12747770.1-1655; dated Jun. 18, 2015; 4 pgs.
International Search Report for International Application No. PCT/CA2015/0051369; International Filing Date: Dec. 23, 2015; dated Mar. 8, 2016; 3 pgs.
International Written Opinion for International Application No. PCT/CA2015/051369; International Filing Date: Dec. 23, 2015; dated Mar. 8, 2016; 4 pgs.
New Zealand Office Action for IP No. 709884; dated Jul. 29, 2015; 2 pgs.
Non-Final Office Action for U.S. Appl. No. 14/808,535, filed Jul. 24, 2015; Notification date Apr. 13, 2016; 32 pgs.
Supplementary European Search Report for application No. EP13829390.7; dated Mar. 9, 2016; 9 pgs.
"Interoperability and Integration of Dismounted Soldier System Weapon Systems"; Major Bruce Gilchrist on behalf of Mr. Mark Richter; SCI-178 RTG-043; May 20, 2009.
"Interoperability and Integration of Dismounted Soldier System Weapon Systems Update"; Mr. Mark Richter; Chairman; SCI-178 RTG-043; May 21, 2008.
"Powered Rail"; Presentation to Intl Infantry & Joint Service Small Arms System Symposium; May 20, 2009; Torbjoern Eld, Chairman; Powered rail team; NATO SCI-178/ RTG-043.

* cited by examiner

DATA

POWER

DATA

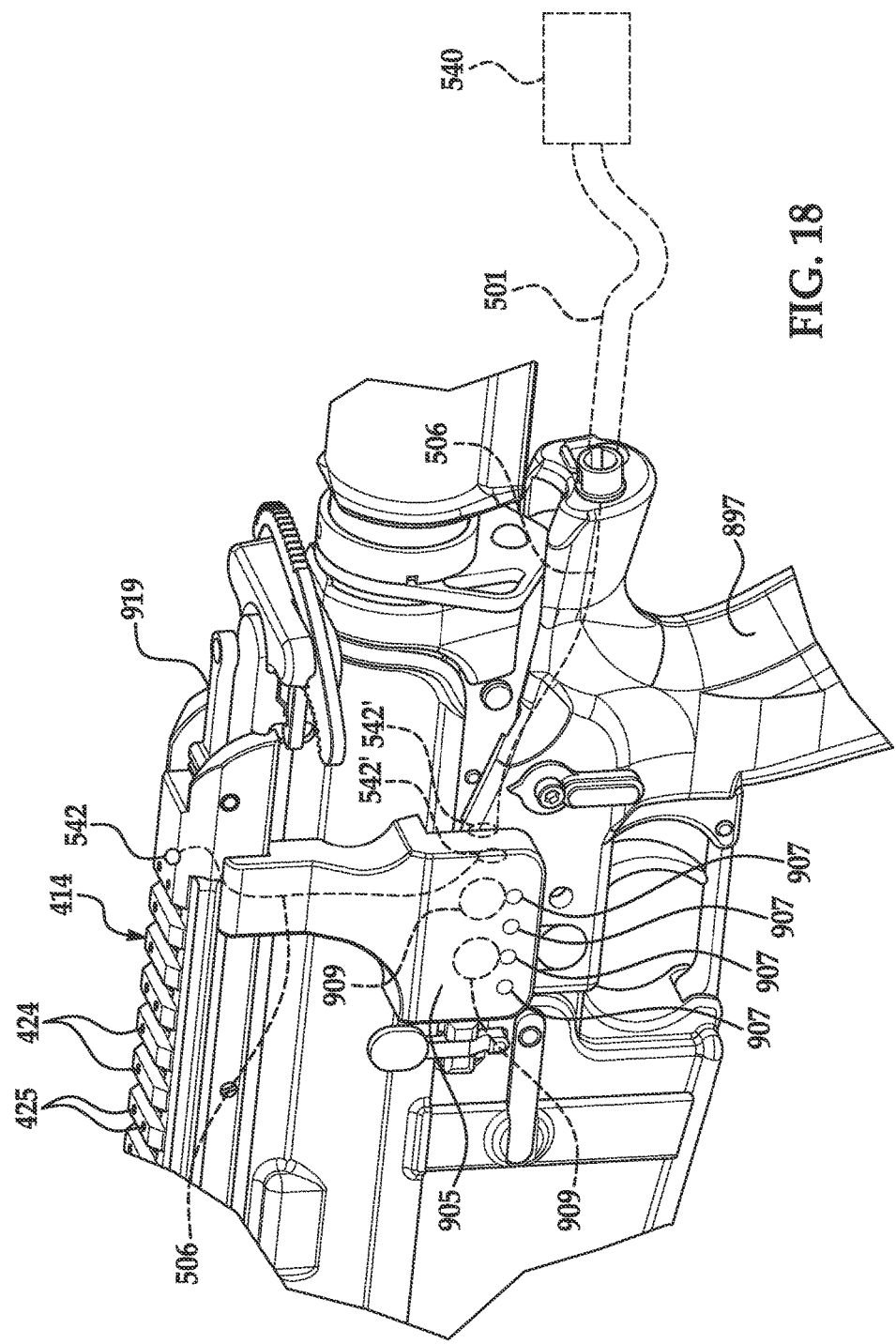

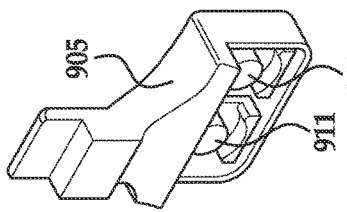
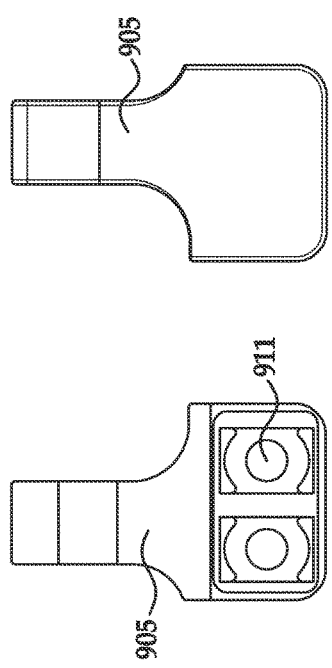
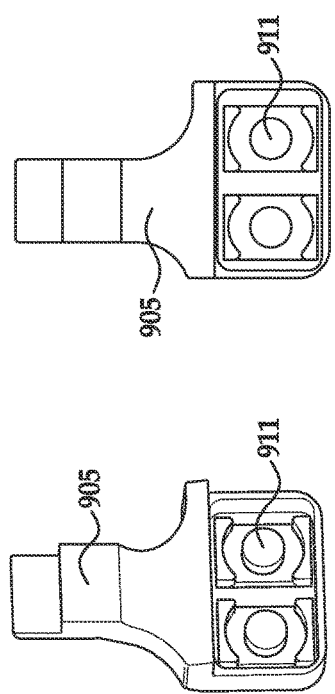
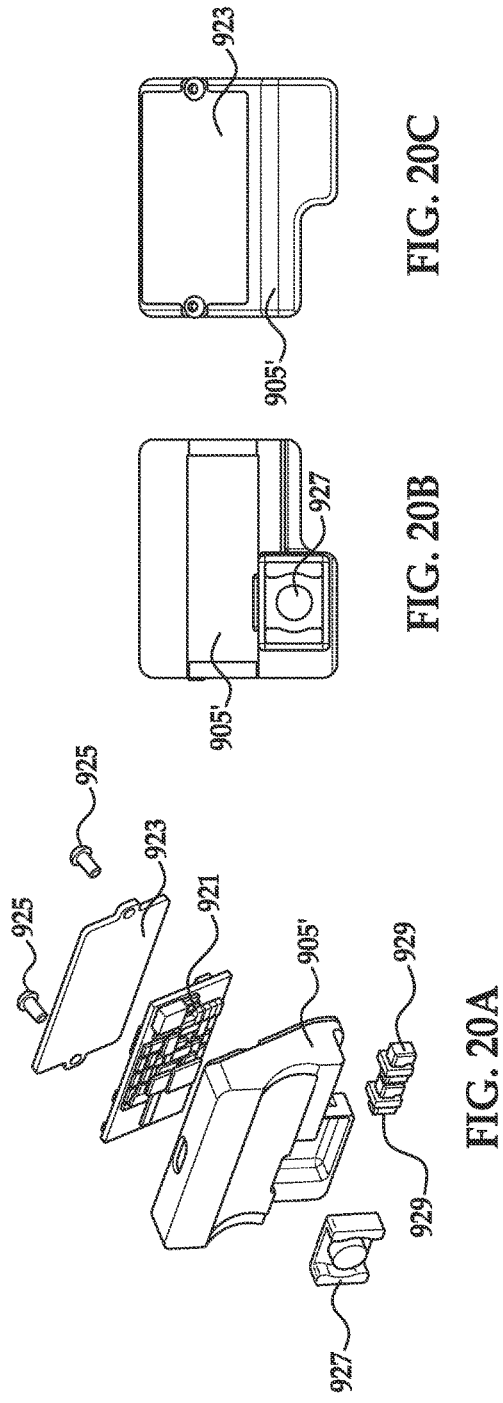

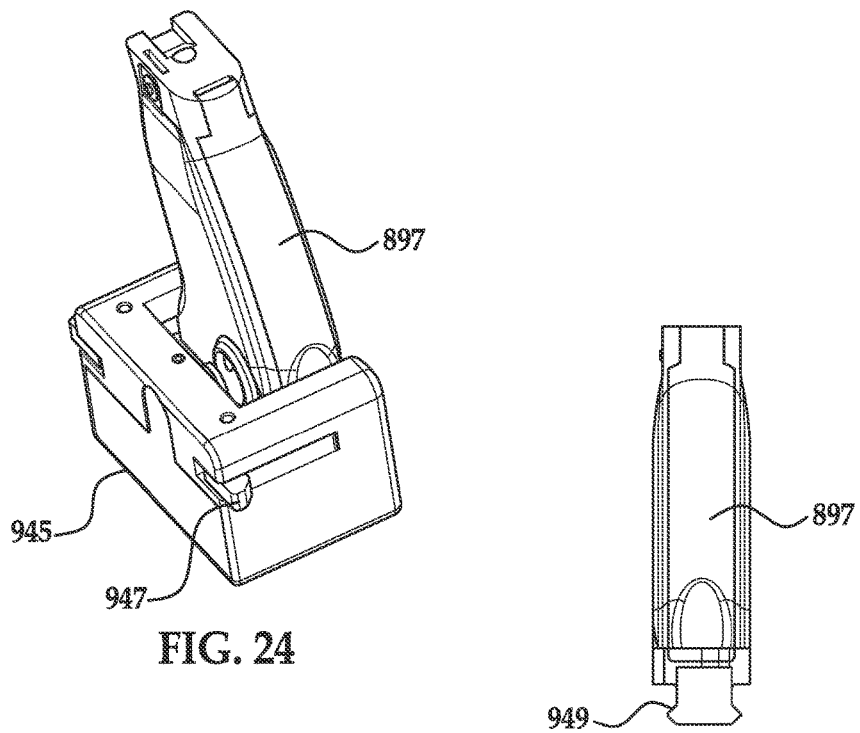
FIG. 24
FIG. 25
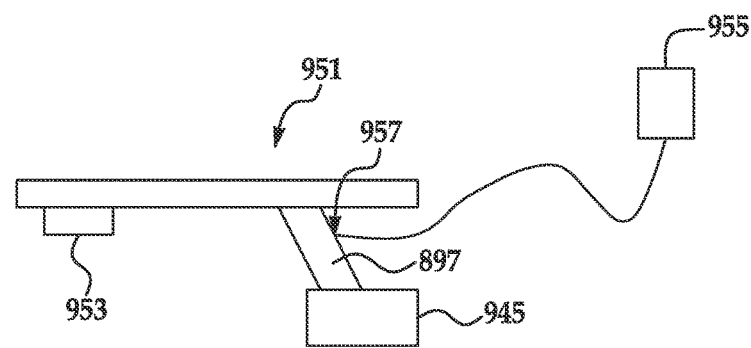
FIG. 26

APPARATUS AND METHOD FOR POWERING AND NETWORKING A RAIL OF A FIREARM

CROSS REFERENCE TO RELATED APPLICATIONS

This application is a divisional of U.S. patent application Ser. No. 13/372,825 filed Feb. 14, 2012, which is a continuation in part of U.S. patent application Ser. No. 12/688,256 filed Jan. 15, 2010, the contents each of which are incorporated herein by reference thereto.

U.S. patent application Ser. No. 13/372,825 filed Feb. 14, 2012 also claims the benefit of U.S. Provisional Patent Application Ser. No. 61/443,085 filed Feb. 15, 2011 and U.S. Provisional Patent Application Ser. No. 61/528,728 filed Aug. 29, 2011, the contents each of which are incorporated herein by reference thereto.

BACKGROUND

Embodiments of the invention relate generally to an inductively powering rail mounted on a device such as a firearm to provide power to accessories, such as: telescopic sights, tactical sights, laser sighting modules, and night vision scopes.

Current accessories mounted on a standard firearm rail such as a MIL-STD-1913 rail, Weaver rail, NATO STANAG 4694 accessory rail or equivalents thereof require that they utilize a battery contained in the accessory. As a result multiple batteries must be available to replace failing batteries in an accessory. Embodiments of the present invention utilize multiple battery power sources to power multiple accessories through the use of an induction system, mounted on a standard firearms rail.

Accordingly, it is desirable to provide a method and apparatus for remotely powering accessories secured to a rail of a firearm.

SUMMARY OF THE INVENTION

In one exemplary embodiment a system for providing inductive power to an accessory on a firearm is provided; the system having: an inductively powering rail operatively connected to one or more batteries, the inductively powering rail comprising a plurality of inductively powering rail slots, each inductively powering rail slot having a primary U-Core, the accessory having secondary U-Cores designed to mate with each primary U-Core to provide an inductive power connection to the accessory.

In another embodiment, there disclosed a method for providing inductive power to an accessory on a firearm; the method including the steps of: detecting an accessory when attached to the firearm and providing an inductive power path with the accessory; and providing power to the accessory from a secondary source should power be required.

In another exemplary embodiment a rail for a weapon is provided, the rail having: a plurality of slots and a plurality of ribs each being located in an alternating fashion on a surface of the rail; a first plurality of pins each having an end portion located on a surface of one of a first plurality of the plurality of ribs; a second plurality of pins each having a first end portion and a second end portion located on a surface of a second plurality of the plurality of ribs.

In still another embodiment a combination of a powered accessory and a rail configured to removably receive and retain the powered accessory is provided; the combination including an apparatus for inductively providing power and data to the powered accessory, wherein the data is exclusively provided to the powered accessory from one of a plurality of coils located within the rail; and wherein the powered accessory further comprises a plurality of coils and the powered accessory is configured to determine when one of the plurality of coils of the powered accessory is adjacent to the one of the plurality of coils of the rail.

In yet another embodiment, a weapon or firearm is provided, the weapon having: an upper receiver; a lower receiver; a powered accessory mounted to a rail of the upper receiver; and an apparatus for inductively providing power and data to the powered accessory, wherein the data is exclusively provided to the powered accessory from one of a plurality of coils located within the rail; and wherein the powered accessory further comprises a plurality of coils and the powered accessory is configured to determine when one of the plurality of coils of the powered accessory is adjacent to the one of the plurality of coils of the rail.

In still another embodiment, a weapon or firearm is provided, the weapon having: an upper receiver; a lower receiver; a powered accessory mounted to a rail of the upper receiver; and an apparatus for inductively networking a microcontroller of the powered accessory to a microcontroller of the upper receiver and a microcontroller of the lower receiver, wherein the data is exclusively provided to the powered accessory from one of a plurality of coils located within the rail; and wherein the powered accessory further comprises a plurality of coils and the powered accessory is configured to determine when one of the plurality of coils of the powered accessory is adjacent to the one of the plurality of coils of the rail.

In still another alternative embodiment, a method of networking a removable accessory of a weapon to a microcontroller of the weapon is provided, the method including the steps of: inductively transferring data between the accessory and the microcontroller via a first pair of coils exclusively dedicated to data transfer; inductively transferring power to the accessory via another pair of pair of coils exclusively dedicated to power transfer; and wherein the accessory is capable of determining the first pair of coils by magnetizing a pin located on the weapon.

Other aspects and features of embodiments of the invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

Other features, advantages and details appear, by way of example only, in the following description of embodiments, the description referring to the drawings in which:

FIG. 18 is a perspective view of a portion of a weapon with the networked powered data system (NPDS) of one embodiment of the present invention;

FIGS. 19A-19D are various views of a component for inductively coupling power and data between an upper receiver and a lower receiver of a weapon used with the networked powered data system (NPDS);

FIGS. 20A-20F are various views of an alternative component for inductively coupling power and data between an upper receiver and a lower receiver of a weapon used with the networked powered data system (NPDS);

FIG. 24 illustrates a battery pack or power supply secured to a pistol grip of an exemplary embodiment of the present invention;

FIG. 25 illustrates an alternative method and apparatus for coupling a battery pack or power supply to an alternative embodiment of the pistol grip; and FIG. 26 is a schematic illustration of a power system of the networked powered data system (NPDS) according to one exemplary embodiment of the present invention.

DETAILED DESCRIPTION

Reference is made to the following U.S. Pat. Nos. 6,792,711; 7,131,228; and 7,775,150 the contents each of which are incorporated herein by reference thereto.

Disclosed herein is a method and system for an inductively powering rail on a rifle, weapon, firearm, (automatic or otherwise), etc. to power accessories such as: telescopic sights, tactical sights, laser sighting modules, Global Positioning Systems (GPS) and night vision scopes. This list is not meant to be exclusive, merely an example of accessories that may utilize an inductively powering rail. The connection between an accessory and the inductively powering rail is achieved by having electromagnets, which we refer to as "primary U-Cores" on the inductively powering rail and "secondary U-Cores" on the accessory. Once in contact with the inductively powering rail, through the use of primary and secondary U-cores, the accessory is able to obtain power though induction.

Embodiments avoid the need for exposed electrical contacts, which may corrode or cause electrical shorting when submerged, or subjected to shock and vibration. This eliminates the need for features such as wires, pinned connections or watertight covers.

Accessories may be attached to various fixture points on the inductively powering rail and are detected by the firearm once attached. The firearm will also be able to detect which accessory has been attached and the power required by the accessory.

Figure 1:
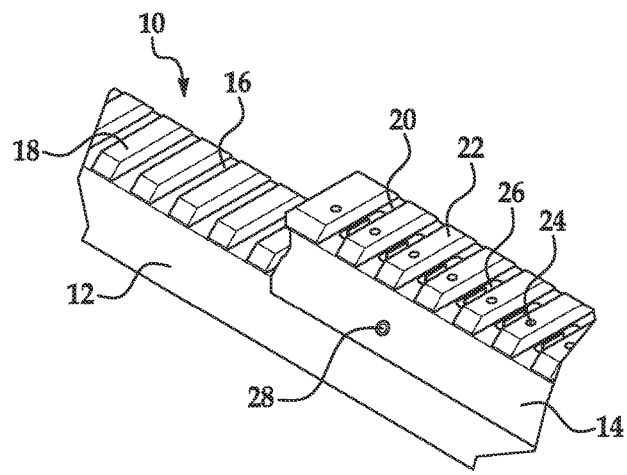
FIG. 1 is a perspective view of an inductively powering rail mounted on a MIL-STD-1913 rail.

Referring now to FIG. 1, a perspective view of an inductively powering rail mounted on a MIL-STD-1913 rail is shown generally as 10.

Feature 12 is a MIL-STD-1913 rail, such as a Weaver rail, NATO STANAG 4694 accessory rail or the like. Sliding over rail 12 is an inductively powering rail 14. Rail 12 has a plurality of rail slots 16 and rail ribs 18, which are utilized in receiving an accessory. An inductively powering rail 14 comprises a plurality of rail slots 20, rail ribs 22 and pins 24, in a configuration that allows for the mating of accessories with inductively powering rail 14. It is not the intent of the inventors to restrict embodiments to a specific rail configuration, as it may be adapted to any rail configuration. The preceding serves only as an example of several embodiments to which inductively powering rail 14 may be mated. In other embodiments, the inductively powering rail 14 can be mounted to devices having apparatus adapted to receive the rail 14.

Pins 24 in one embodiment are stainless steel pins of grade 430. When an accessory is connected to inductively powering rail 14, pins 24 connect to magnets 46 and trigger magnetic switch 48 (see FIG. 3) to indicate to the inductively powering rail 14 that an accessory has been connected. Should an accessory be removed the connection is broken and recognized by the system managing inductively powering rail 14 Pins 24 are offset from the centre of inductively powering rail 14 to ensure an accessory is mounted in the correct orientation, for example a laser accessory or flashlight accessory could not be mounted backward, and point in the users face as it would be required to connect to pins 24, to face away from the user of the firearm. Pin hole 28 accepts a cross pin that locks and secures the rails 12 and 14 together.

Figure 2:
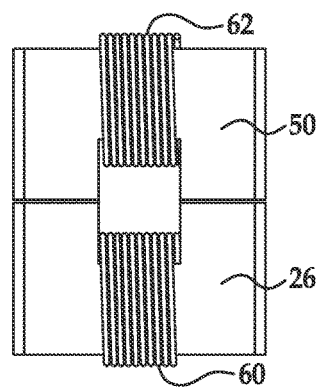
FIG. 2 is cross section vertical view of a primary U-Core and a secondary U-Core.

Referring now to FIG. 2, a cross section vertical view of a primacy U-Core and a secondary U-Core is shown. Primary U-Core 26 provides inductive power to an accessory when connected to inductively powering rail 14. Each of primary U-core 26 and secondary U-core 50 are electromagnets. The wire wrappings 60 and 62 provide an electromagnetic field to permit inductive power to be transmitted bi-directionally between inductively powering rail 14 and an accessory. Power sources for each primary U-core 26 or secondary U-core 50 may be provided by a plurality of sources. A power source may be within the firearm, it may be within an accessory or it may be provided by a source such as a battery pack contained in the uniform of the user that is connected to the firearm, or by a super capacitor connected to the system. These serve as examples of diverse power sources that may be utilize by embodiments of the invention.

Figure 3:
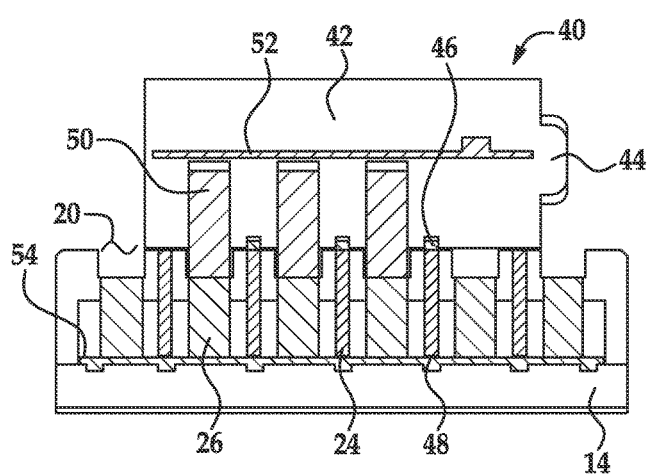
FIG. 3 is a longitudinal cross section side view of an accessory mounted to an inductively powering rail.

Referring now to FIG. 3, a longitudinal cross section side view of an accessory mounted to an inductively powering rail 14; is shown generally as 40. Accessory 42 in this example is a lighting accessory, having a forward facing lens 44. Accessory 42 connects to inductively powering rail 14, through magnets 46 which engage pins 24 and trigger magnetic switch 48 to establish an electrical connection, via primary PCB 54, to inductively powering rail 14.

As shown in FIG. 3, three connections have been established to inductively powering rail 14 through the use of magnets 46. In addition, three secondary U-cores 50 connect to three primary U-cores 26 to establish an inductive power source for accessory 42. To avoid cluttering the Figure, we refer to the connection of secondary U-core 50 and primary U-core 26 as an example of one such mating. This connection between U-cores 50 and 26 allows for the transmission of power to and from the system and the accessory. There may be any number of connections between an accessory 42 and an inductively powering rail 14, depending upon power requirements. In one embodiment each slot provides on the order of two watts. Of course, power transfers greater or less than two watts are considered to be within the scope of embodiments disclosed herein.

In both the accessory 42 and the inductively powering rail 14 are embedded Printed Circuit Boards (PCBs), which contain computer hardware and software to allow each to communicate with each other. The PCB for the accessory 42 is shown as accessory PCB 52. The PCB for the inductively powering rail 14 is shown as primary PCB 54. These features are described in detail with reference to FIG. 5 and FIG. 6.

Figure 4:
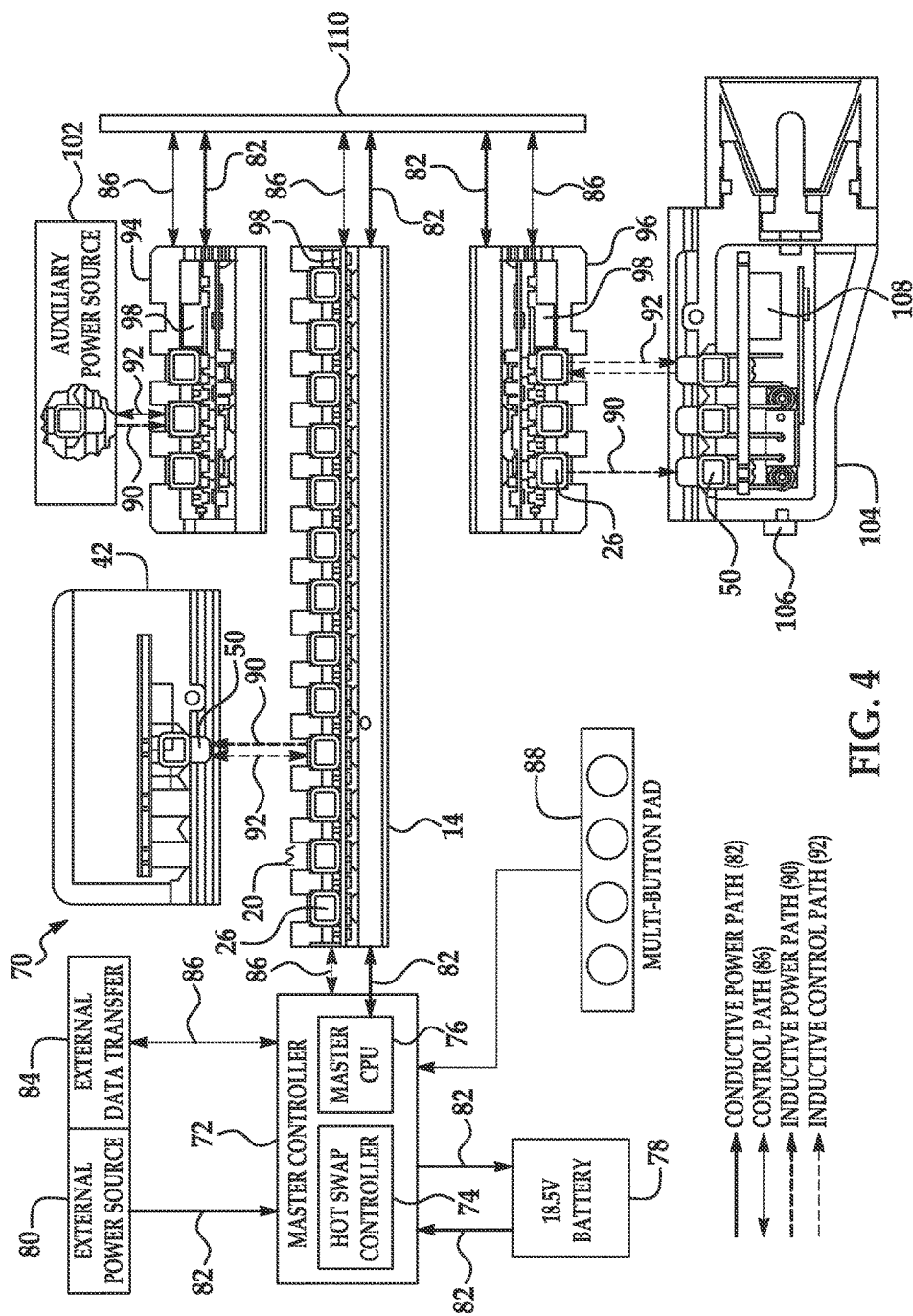
FIG. 4 is a block diagram of the components of one embodiment of an inductively powered rail system.

Referring now to FIG. 4 a block diagram of the components of an inductively powered rail system is shown generally as 70.

Figure 9:
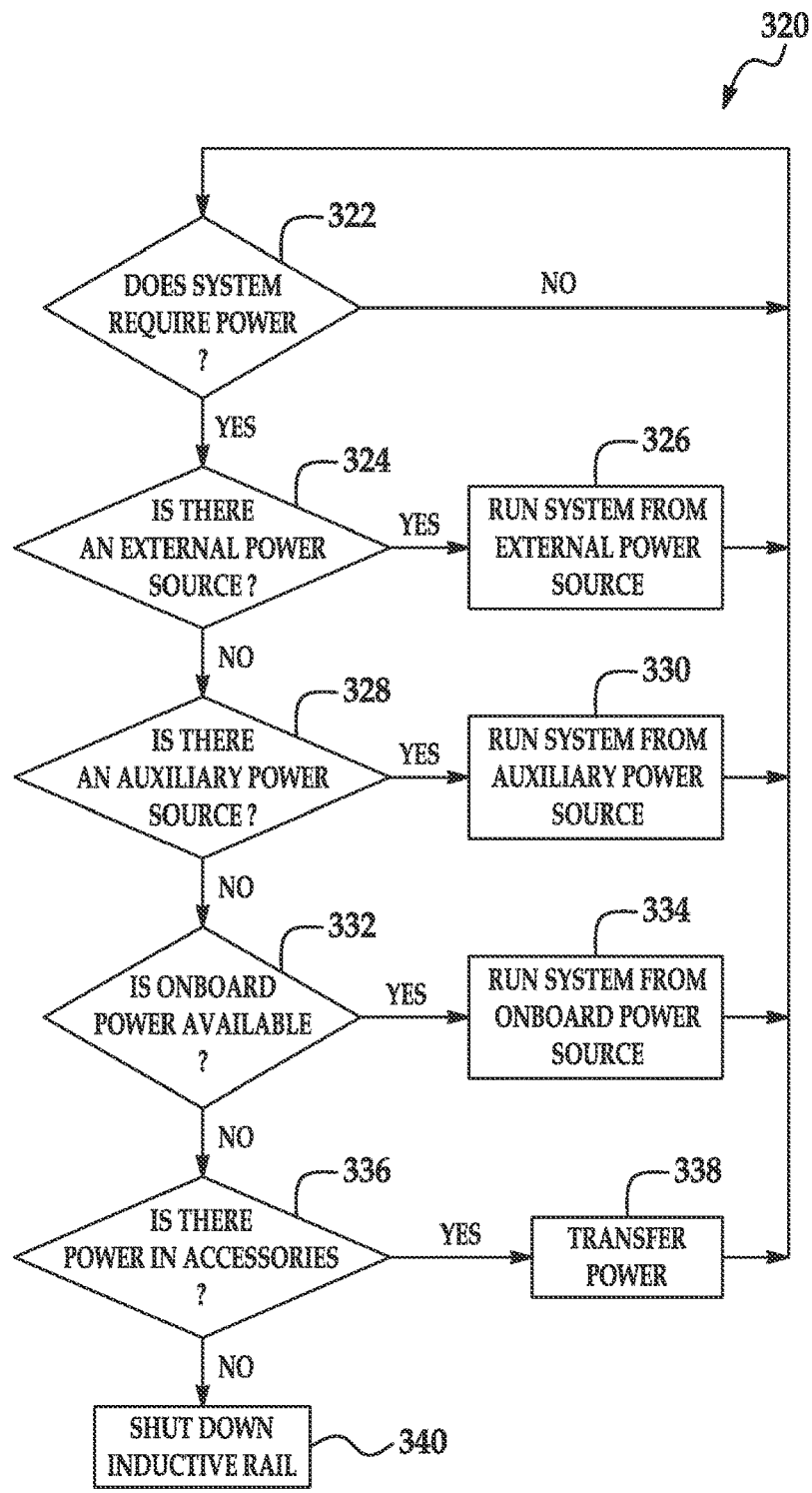
FIG. 9 is a flow chart of the steps for managing power usage.

System 70 may be powered by a number of sources, all of which are controlled by master controller 72. Hot swap controller 74 serves to monitor and distribute power within system 7. The logic of power distribution is shown in FIG. 9. Hot swap controller 74 monitors power from multiple sources. The first in one embodiment being one or more 18.5V batteries 78 contained within the system 70, for example in the stock or pistol grip of a firearm. This voltage has been chosen as optimal to deliver two watts to each inductively powering rail slot 20 to which an accessory 42 is connected. This power is provided through conductive power path 82. A second source is an external power source 80, for example a power supply carried external to the system by the user. The user could connect this source to the system to provide power through conductive power path 82 to recharge battery 78. A third source may come from accessories, which may have their own auxiliary power source 102, i.e. they have a power source within them. When connected to the system, this feature is detected by master CPU 76 and the power source 102 may be utilized to provide power to other accessories through inductive power path 90, should it be needed.

Power is distributed either conductively or inductively. These two different distribution paths are shown as features 82 and 90 respectively. In essence, conductive power path 82 powers the inductively powering rail 14 while inductive power path 90 transfers power between the inductively powering rail 14 and accessories such as 42.

Master CPU 76 in one embodiment is a Texas Instrument model MSP430F228, a mixed signal processor, which oversees the management of system 70. Some of its functions include detecting when an accessory is connected or disconnected, determining the nature of an accessory, managing power usage in the system, and handling communications between the rail(s), accessories and the user.

Shown in FIG. 4 are three rails. The first being the main inductively powering rail 14 and side rail units 94 and 96. Any number of rails may be utilized. Side rail units 94 and 96 are identical in configuration and function identically to inductively powering rail unit 14 save that they are mounted on the side of the firearm and have fewer inductively powered sail slots 20. Side rail units 94 and 96 communicate with master CPU 76 through communications bus 110, which also provides a path for conductive power. Communications are conducted through a control path 86. Thus Master CPU 76 is connected to inductively powering rail 14 and through rail 14 to the microcontrollers 98 of side rails 94 and 96. This connection permits the master CPU 76 to determine when an accessory has been connected, when it is disconnected, its power level and other data that may be useful to the user, such as GPS feedback or power level of an accessory or the system. Data that may be useful to a user is sent to external data transfer module 84 and displayed to the user. In addition data such as current power level, the use of an accessory power source and accessory identification may be transferred between accessories. Another example would be data indicating the range to a target which could be communicated to an accessory 42 such as a scope.

Communications may be conducted through an inductive control path 92. Once an accessory 42, such as an optical scope are connected to the system, it may communicate with the master CPU 76 through the use of inductive control paths 92. Once a connection has been made between an accessory and an inductively powering rail 14, 94 or 96 communication is established from each rail via frequency modulation on an inductive control path 92, through the use of primary U-cores 26 and secondary U-Cores 50. Accessories such as 42 in turn communicate with master CPU 76 through rails 14, 94 or 96 by load modulation on the inductive control path 92.

By the term frequency modulation the inventors mean Frequency Shift Key Modulation (FSK). A rail 14, 94, or 96 sends power to an accessory 42, by turning the power on and off to the primary U-core 26 and secondary U-core 50. This is achieved by applying a frequency on the order of 40 kHz. To communicate with an accessory 42 different frequencies ay be utilized. By way of example 40 kHz and 50 kHz may be used to represent 0 and 1 respectively. By changing the frequency that the primary U-cores are turned on or off information may be sent to an accessory 42. Types of information that may be sent by inductive control path 92 may include asking the accessory information about itself, telling the accessory to enter low power mode, ask the accessory to transfer power. The purpose here is to have a two way communication with an accessory 42.

By the term load modulation the inventors mean monitoring the load on the system 70. If an accessory 42 decreases or increases the amount of power it requires then master CPU 76 will adjust the power requirements as needed.

Accessory 104 serves as an example of an accessory, being a tactical light. It has an external power on/off switch 106, which many accessories may have as well as a safe start component 108. Safe start component 108 serves to ensure that the accessory is properly connected and has appropriate power before turning the accessory on.

Multi button pad 88 may reside on the firearm containing system 70 or it may reside externally. Multi button pad 88 permits the user to turn accessories on or off or to receive specific data, for example the distance to a target or the current GPS location. Multi-button pad 88 allows a user to access features the system can provide through external data transfer module 84.

Figure 5:
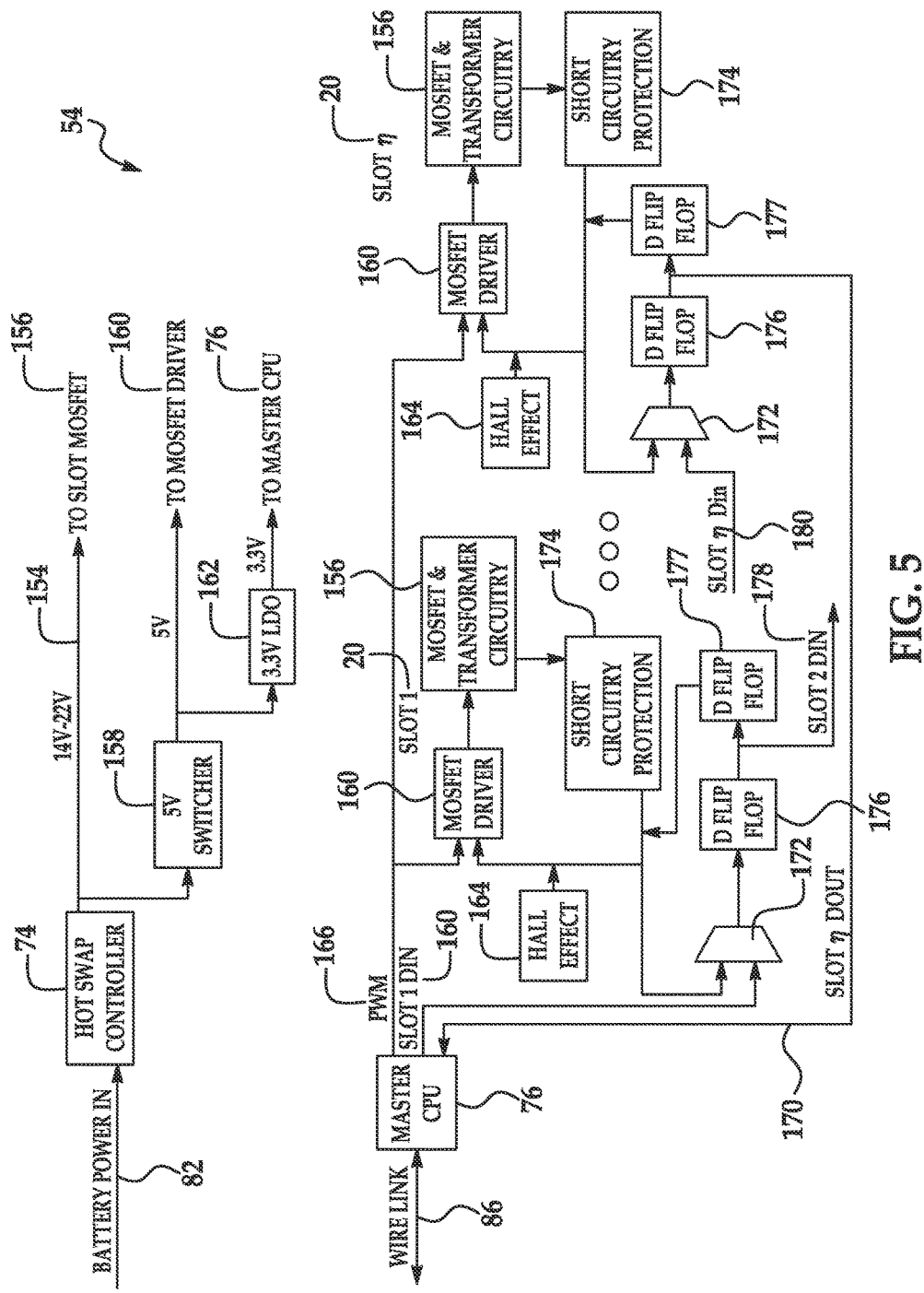
FIG. 5 is a block diagram of a primary Printed Circuit Board (PCB) contained within an inductively powering rail.

Referring now to FIG. 5 a block diagram of a primary Printed Circuit Board (PCB) contained within an inductively powering rail is shown as feature 54.

Power is received by PCB 54 via conductive power path 82 from master controller 72 (see FIG. 4). Hot swap controller 74 serves to load the inductively powering rail 14 slowly. This reduces the amount of in rush current during power up. It also limits the amount of current that can be drawn from the inductively powering rail 14. Conductive power is distributed to two main components, the inductively powering rail slots 20 and the master CPU 76 residing on PCB 54.

Hot swap controller 74 provides via feature 154, voltage in the range of 14V to 22V which is sent to a MOSFET and transformer circuitry 156 for each inductively powering rail slot 20 on inductively powering rail 14.

Feature 158 is a 5V switcher that converts battery power to 5V for the use of MOSFET drivers 160. MOSFET drivers 160 turn the power on and off to MOSFET and transformer circuitry 156 which provides the power to each primary U-Core 26. Feature 162 is a 3.3V Linear Drop Out Regulator (LDO), which receives its power from 5V switcher 158. LDO 162 provides power to mastel CPU 76 and supporting logic within each slot. Supporting logic is Mutiplexer 172 and D Flip Flops 176.

The Multiplexer 172 and the D Flip-Flops 176, 177 are utilized as a serial shift register. Any number of multiplexers 172 and D Flip-Flops 176, 177 may be utilized, each for one inductively powered rail slot 20. This allows master CPU 76 to determine which slots are enabled or disabled and to also enable or disable a slot. The multiplexer 172 is used to select between shifting the bit from the previous slot or to provide a slot enable signal. The first D Flip Flop 176 latches the content of the Multiplexer 172 and the second D Flip-Flop 177 latches the value of D Flip-Flop 177 if a decision is made to enable or disable a slot.

Hall effect transistor 164 detects when an accessory is connected to inductively powering rail 14 and enables MOSFET driver 160.

Figure 6:
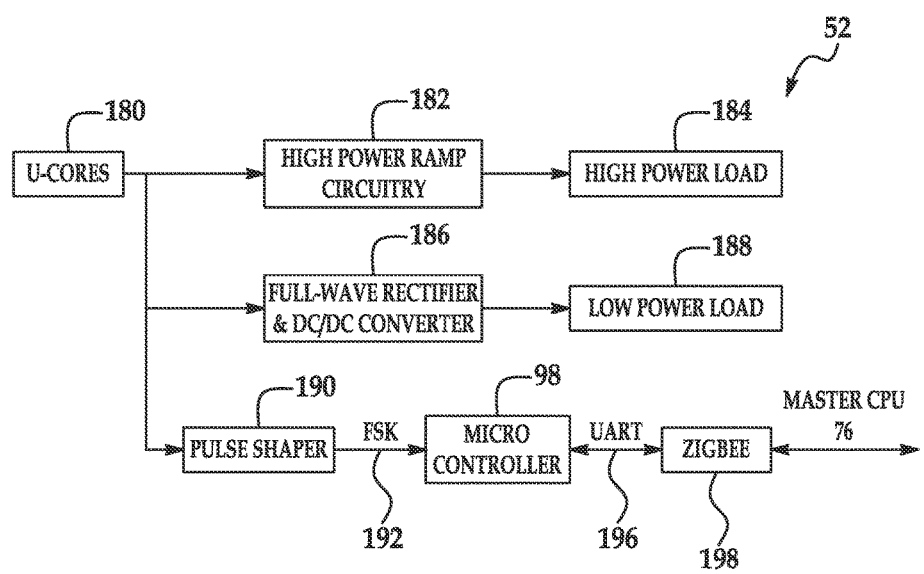
FIG. 6 is a block diagram of a PCB contained within an accessory.

Referring now to FIG. 6 a block diagram of a PCB contained within an accessory such as 42 is shown generally as 52 Feature 180 refers to the primary U-Core 26 and the secondary U-Core 50, establishing a power connection between inductively powering rail 14 and accessory 42. High power ramp circuitry 182 slowly ramps the voltage up to high power load when power is turned on. This is necessary as some accessories such as those that utilize XEON bulbs when turned on have low resistance and they draw excessive current. High power load 184 is an accessory that draws more than on the order of two watts of power.

Full wave rectifier and DC/DC Converter 186 rectifies the power from U-Cores 180 and converts it to a low power load 188, for an accessory such as a night vision scope. Pulse shaper 190 clamps the pulse fiam the U-Cores 180 so that it is within the acceptable ranges for microcontroller 98 and utilizes FSK via path 192 to provide a modified pulse to microcontroller 98 Microcontroller 98 utilizes a Zigbee component 198 via Universal Asynchronous Receiver Transmitter component (UART 196) to communicate between an accessory 42 and master controller 72. The types of information that may be communicated would include asking the accessory for information about itself, instructing the accessory to enter low power mode or to transfer power.

Figure 7:
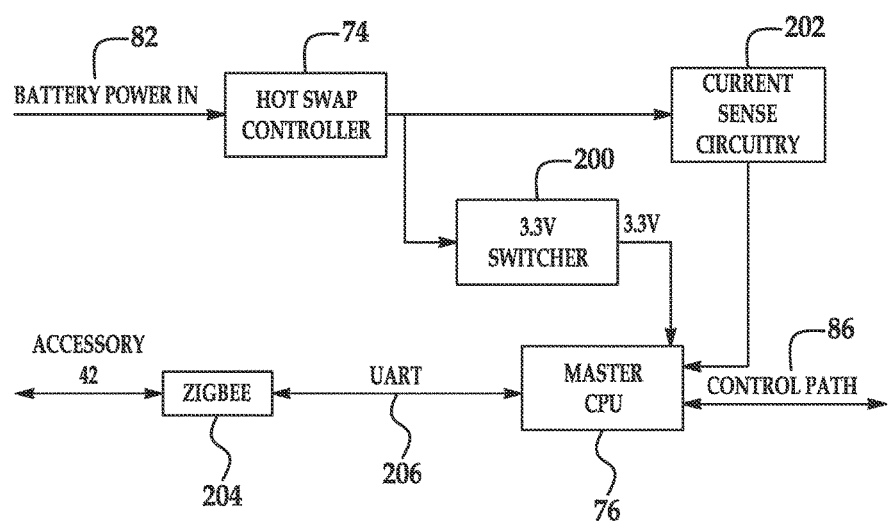
FIG. 7 is a block diagram of the components of a master controller.

Referring now to FIG. 7, a block diagram of the components of a master controller 72 is shown (see FIG. 1) Conductive power is provided from battery 78 via conductive power path 82. Hot swap controller 74 slowly connects the load to the inductively powering rail 14 to reduce the amount of in rush current during power up. This also allows for the limiting of the amount of current that can be drawn. Feature 200 is a 3.3 v DC/DC switcher, which converts the battery voltage to 3.3V to be used by the master CPU 76.

Current sense circuitry 202 measures the amount of the current being used by the system 70 and feeds that information back to the master CPU 76. Master controller 72 also utilizes a Zigbee component 204 via Universal Asynchronous Receiver Transmitter component (UART) 206 to communicate with accessories connected to the inductively powering rail 14, 94 or 96.

Figure 8:
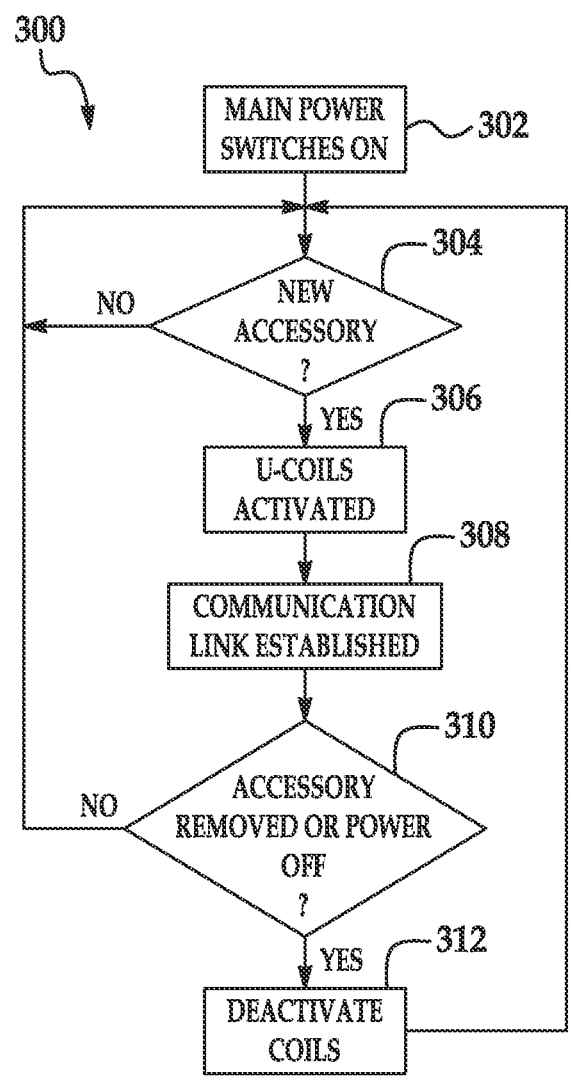
FIG. 8 is a flow chart of the steps of connecting an accessory to an inductively powering rail.
Figure 10:
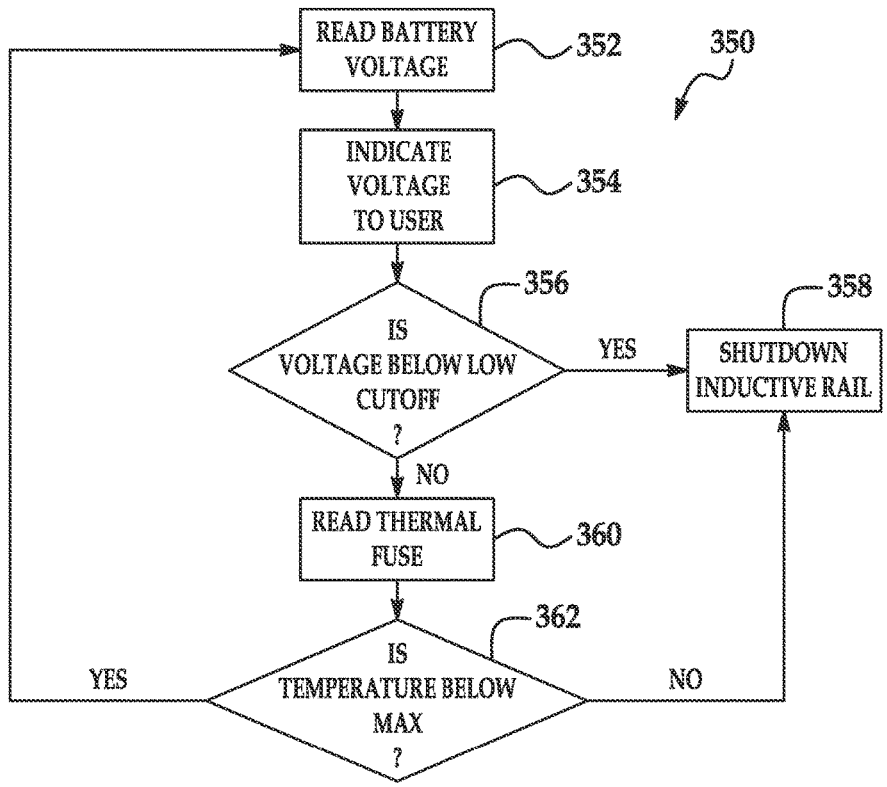
FIG. 10 is a flow chart of the steps for determining voltage and temperature of the system.

Before describing FIGS. 8, 9 and 10 in detail, we wish the reader to know that these Figures are flowcharts or processes that run in parallel, they each have there own independent tasks to perform. They may reside on any device but in one embodiment all would reside on master CPU 76.

Referring now to FIG. 8, a flow chart of the steps of connecting an accessory to an inductively powering rail is shown generally as 300. Beginning at step 302, the main system power switch is turned on by the user through the use of multi-button pad 88 or another switch as selected by the designer. Moving next to step 304 a test is made to determine if an accessory, such as feature 42 of FIG. 4 has been newly attached to inductively powering rail 14 and powered on or an existing accessory 42 connected to inductively powering rail 14 is powered on. At step 306 the magnets 46 on the accessory magnetize the pins 24 thereby closing the circuit on the primary PCB 54 via magnetic switch 48 and thus allowing the activation of the primary and secondary U-cores 26 and 50, should they be needed. This connection permits the transmission of power and communications between the accessory 42 and the inductively powering rail 14 (see features 90 and 92 of FIG. 4).

Moving now to step 308 a communication link is established between the master CPU 76 and the accessory via control inductive control path 92. Processing then moves to step 310 where a test is made to determine if an accessory has been removed or powered off. If not, processing returns to step 304. If so, processing moves to step 312 where power to the primary and secondary U-Cores 26 and 50 for the accessory that has been removed.

FIG. 9 is a flow chart of the steps for managing power usage shown generally as 320. There may be a wide range of accessories 42 attached to an inductively powering rail 14. They range from low powered (1.5 to 2.0 watts) and high powered (greater than 2.0 watts). Process 320 begins at step 322 where a test is made to determine if system 70 requires power. This is a test conducted by master CPU 76 to assess if any part of the system is underpowered. This is a continually running process. If power is at an acceptable level, processing returns to step 322. If the system 70 does require power, processing moves to step 324. At step 324 a test is made to determine if there is an external power source. If so, processing moves to step 326 where an external power source such as 80 (see FIG. 4) is utilized. Processing then returns to step 322. If at step 324 it is found that there is no external power source, processing moves to step 328. At step 328 a test is made to determine if there is an auxiliary power source such as feature 102 (see FIG. 4). If so processing moves to step 330 where the auxiliary power source is utilized. Processing then returns to step 322. If at step 328 it is determined that there is no auxiliary power source, processing moves to step 332. At step 332 a test is made to determine if on board power is available. On board power comprises a power device directly connected to the inductively powering rail 14. If such a device is connected to the inductively powering rail 14, processing moves to step 334 where the system 70 is powered by on board power. Processing then returns to step 322. If at step 332 no on board power device is located processing moves to step 336. At step 336 a test is made to determine if there is available power in accessories. If so, processing moves to step 338 where power is transferred to the parts of the system requiring power from the accessories. Processing then returns to step 322. If the test at step 336 finds there is no power available, then the inductively powering rail 14 is shut down at step 340.

The above steps are selected in an order that the designers felt were reasonable and logical. That being said, they do not need to be performed in the order cited nor do they need to be sequential. They could be performed in parallel to quickly report back to the Master CPU 76 the options for power.

FIG. 10 is a flow chart of the steps for determining voltage and temperature of the system, shown generally as 350. Beginning at step 352 a reading is made of the power remaining in battery 78. The power level is then displayed to the user at step 354. This permits the user to determine if they wish to replace the batteries or recharge the batteries from external power source 80. Processing moves next to step 356 where a test is made on the voltage. In one embodiment the system 70 utilizes Lithium-Ion batteries, which provide near constant voltage until the end of their life, which allows the system to determine the decline of the batteries be they battery 78 or batteries within accessories. If the voltage is below a determined threshold processing moves to step 358 and system 70 is shut down. If at step 356 the voltage is sufficient, processing moves to step 360. At this step a temperature recorded by a thermal fuse is read. Processing then moves to step 362, where a test is conducted to determine if the temperature is below a specific temperature. Lithium-Ion batteries will typically not recharge below −5 degrees Celsius. If it is too cold, processing moves to step 358 where inductively powering rail 14 is shut down. If the temperature is within range, processing returns to step 352.

With regard to communication between devices in system 70 there are three forms of communication, control path 86, inductive control path 92 and Zigbee (198, 204). Control path 86 provides communications between master CPU 76 and inductively powered rails 14, 94 and 96. Inductive control path 92 provides communication between an accessory such as 42 with the inductively powered rails 14, 94 and 96. There are two lines of communication here, one between the rails and one between the accessories, namely control path 86 and inductive control path 92 Both are bidirectional The Zigbee links (198, 204) provide for a third line of communication directly between an accessory such as 42 and master CPU 76.

Referring now to FIGS. 11-19D alternative embodiments of the present invention are illustrated. As with the previous embodiments, a rail configuration designed to mount accessories such as sights, lasers and tactical lights is provided. In accordance with an exemplary embodiment a Networked Powered Data System (NPDS) is provided wherein the rail or rails is/are configured to provide power and data through a weapon coupled to accessories. Furthermore and in additional embodiments, the power and data may be exchanged between the weapon and/or a user coupled to the weapon by a tether and in some applications the user is linked a communications network that will allow data transfer to other users who may or may not also have weapons with rail configurations that are coupled to the communications network.

As used herein rails may refer to inductively powered rails or Networked Powered Data System rails. As previously described, the rails will have recoil slots that provide data and power as well as mechanically securing the accessory to the rail.

In this embodiment, or with reference to the NPDS rail, specific recoil slots have been dedicated for power only while other recoil slots have been configured for data communication only. In one non-limiting exemplary embodiment, one of every three rail slots is dedicated for data communication and two of every three rail slots are dedicated to power transfer. Therefore, every three slots in this embodiment will be functionality defined as two power slots and one communications slot. In one non-limiting configuration, the slots will be defined from one end of the rail and the sequence will be as follows: first slot from an end of the rail is dedicated to data, second slot from the end is dedicated to power, third slot from the end is dedicated to power, fourth slot from the end is dedicated to data, fifth slot from the end is dedicated to power, six slot from the end is dedicated to power, etc. Of course, exemplary embodiments of the present invention contemplate any variations on the aforementioned sequence of data and power slots.

Contemplated accessories for use with the NPDS rail would optimally have either a 3 slot or 6 slot or longer multiples of power-data sequence to benefit from interfacing with power and data slot sequence mentioned above. Accordingly, the accessory can be placed at random anywhere on the rail. In this embodiment, the accessory will have the capability to discern which recoil slot is dedicated to power and which recoil slot is dedicated to data.

In contrast, to some of the prior embodiments data and power was provided in each slot however and by limiting specific slots to data only higher rates of data transfer were obtained.

Figure 11:
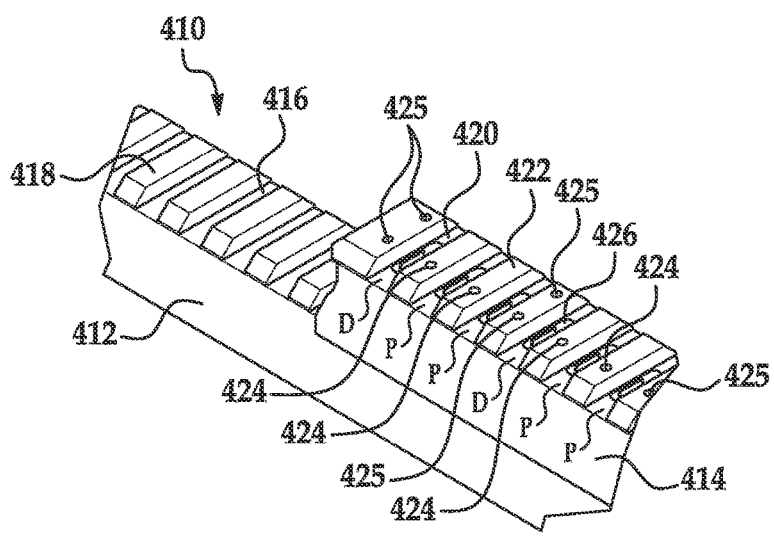
FIG. 11 is a perspective view of a portion of a rail of a networked powered data system (NPDS) in accordance with an embodiment of the present invention.

As illustrated in FIG. 11, a perspective view of an inductively powered NPDS rail is shown generally as 410. As in the previous embodiments, an inductively powering rail 414 is slid over a rail 412 that has a plurality of rail slots 416 and rail ribs 418. Alternatively, the rail 414 may be integral with the upper receiver and replace rail 412. The inductively powering rail 414 has a plurality of rail slots 420, rail ribs 422 and pins 424, 425. The rail slots and ribs are arranged for mating of accessories with inductively powering rail 414. As discussed above, pins 424 are associated with powered slots "P" while pins 425 are associated with data slots "D". It is not the intent of the inventors to restrict embodiments to a specific rail configuration, as it may be adapted to any rail configuration. The preceding serves only as an example of several embodiments to which inductively powering rail 414 may be mated.

In one embodiment each slot provides on the order of four watts. Of course, power transfers greater or less than four watts are considered to be within the scope of embodiments disclosed herein.

Figure 12A:
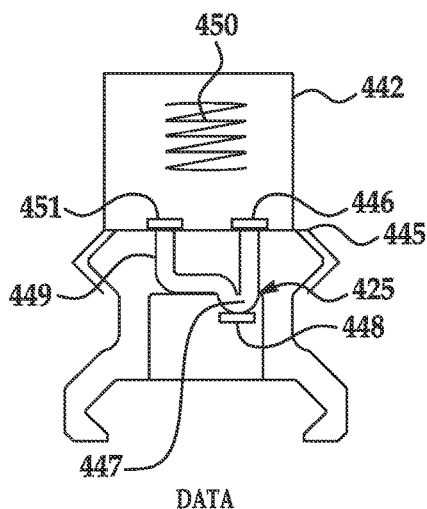
FIGS. 12A-12C are cross-sectional views of an accessory mounted to a networked powered data system (NPDS)
Figure 12B:
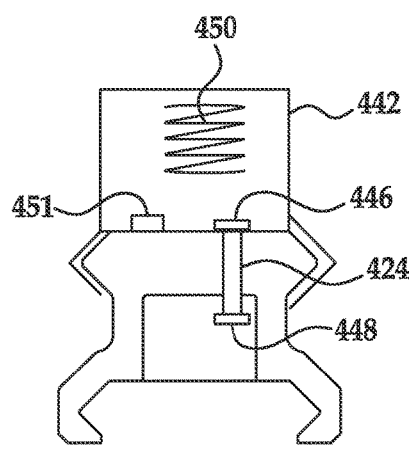

Pins 424 and 425 are in one embodiment stainless steel pins of grade 430. Of course, other alternative materials are contemplated and the embodiments of the present invention are not limited to the specific materials mentioned above. Referring now to FIGS. 12A and 12B and when an accessory 442 is connected to inductively powering rail 414, pins 424 and 425 are magnetized by magnets 446 located within each portion of the accessory configured to be positioned over the ribs 422 of the rail 414 such that pins 424 and 425 are magnetized by the magnets 446. As illustrated in FIG. 12A, which is a cross sectional view of a portion of an accessory coupled to the rail, each pin 425 is configured such that a first end 445 is located on top of rib 422, an intermediate portion 447 of pin 425 is located above magnetic switch 448 and a second end 449 is also located on rib 422. Accordingly and when pin 425 is magnetized by magnet 446 in accessory 442 when the accessory is placed upon the rail, the magnetized pin 425 causes magnetic switch 448 to close to indicate to the inductively powering rail 414 that an accessory has been connected to the data slot D.

In addition and in this embodiment, accessory 442 is provided with a magnetic accessory switch 451 that is also closed by the magnetized pin 425 which now returns to the surface of rib 422. Here, the accessory via a signal from magnetic switch 451 to a microprocessor resident upon the accessory will be able to determine that the secondary coil 450 associated with the switch 451 in FIG. 12A is located above a data slot D and this coil will be dedicated to data transfer only via inductive coupling. Accordingly, the data recoil slot is different from the power slot in that the associated type 430 stainless steel pin is extended to become a fabricated clip to conduct the magnetic circuit from the accessory to the rail and back again to the accessory. The clip will provide a magnetic field which, will activate the solid state switch or other equivalent item located within the rail on the one side and then will provide a path for the magnetic field on the other side of the rail reaching up to the accessory. Similarly, the accessory will have a solid state switch or equivalent item located at each slot position which, will be closed only if it is in proximity with the activated magnetic field of the data slot. This provides detection of the presence and location of the adjacent data slot. In accordance with various embodiments disclosed herein, the accessory circuitry and software is configured to interface with the rail in terms of power and data communication.

In contrast and referring to FIG. 12B, which is a cross sectional view of an another portion of the accessory secured to the rail, the secondary coil 450 associated with switch 451 of the portion of the accessory illustrated in FIG. 12B will be able to determine that the secondary coil 450 associated with the switch 451 in FIG. 12B is located above a power slot P and this coil will be dedicated to power transfer only via inductive coupling. As mentioned, above the complimentary accessory is configured to have a secondary coil 450, magnet 446 and switch 451 for each corresponding rib/slot combination of the rail they are placed on such that the accessory will be able to determine if it has been placed on a data only D of power only P slot/rib combination according to the output of switch 451.

It being understood that in one alternative embodiment the primary coils associated with a rib containing pin 424 or pin 425 (e.g., data or power coils) may in one non-limiting embodiment be on either side of the associated rib and accordingly the secondary coils of the accessory associated with switch 451 will be located in a corresponding location on the accessory. For example, if the data slots are always forward (from a weapon view) from the rib having pin 425 then the accessory will be configured to have the secondary coils forward from its corresponding switch 451. Of course and in an alternative configuration, the configuration could be exactly opposite. It being understood that the ribs at the end of the rail may only have one slot associated with it or the rail itself could possible end with a slot instead of a rib.

Still further and in another alternative embodiment, the slots on either side of the rib having pin 425 may both be data slots as opposed to a single data slot wherein a data/power slot configuration may be as follows: . . . D, D, P, P, D, D, . . . as opposed to . . . D, P, P, D, P, P . . . for the same six slot configurations however, and depending on the configuration of the accessory being coupled to the rail a device may now have two data slots (e.g., secondary coils on either side of switch 451 that are now activated for data transfer). Of course, any one of numerous combinations are contemplated to be within the scope of exemplary embodiments of the present invention and the specific configurations disclosed herein are merely provided as non-limiting examples.

As in the previous embodiment and should the accessory be removed and the connection between the accessory and the rail is broken, the change in the state of the switch 451 and switch 448 is recognized by the system managing inductively powering rail 414. As in the previous embodiment, pins 424 can be offset from the center of inductively powering rail 414 to ensure an accessory is mounted in the correct orientation.

Figure 12C:
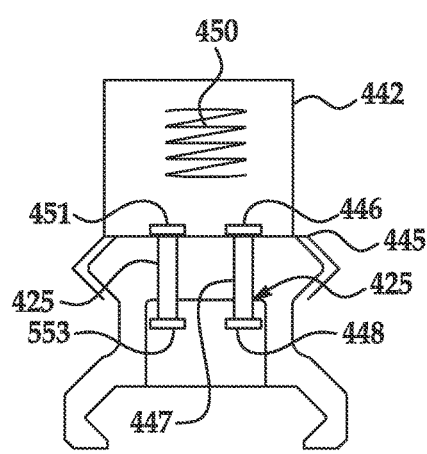

In yet another alternative and referring now to FIG. 12C, a pair of pins 425 are provided in the data slot and a pair of separate magnets (accessory magnet and rail magnet are used). Here the pins are separated from each other and one pin 425, illustrated on the right side of the FIG., is associated with the accessory magnet 446 and rail switch 448 similar to the FIG. 12A embodiment however, the other pin 425 illustrated on the left side of the FIG., is associated with the accessory switch 451 and a separate rail magnet 453, now located in the rail. Operation of accessory switch 451 and rail switch 448 are similar to the previous embodiments.

Power for each primary 426 or secondary 450 can be provided by a plurality of sources. For example, a power source may be within the firearm, it may be within an accessory or it may be provided by a source such as a battery pack contained in the uniform of the user that is connected to the firearm, or by a super capacitor connected to the system. The aforementioned serve merely as examples of diverse power sources that may be utilize by embodiments of the invention.

Although illustrated for use in inductive coupling of power and/or data to and from an accessory to the rail, the pin(s), magnet(s) and associated switches and arrangements thereof will have applicability in any type of power and data transfer arrangement or configurations thereof (e.g., non-inductive, capacitive, conductive, or equivalents thereof, etc.).

Aside from the inductive power transferring, distributing and managing capabilities, the NPDS also has bidirectional data communication capabilities. As will be further discussed herein data communication is further defined as low speed communication, medium speed communication and high speed communication. Each of which according to the various embodiments disclosed herein may be used exclusively or in combination with the other rates/means of data communication. Thus, there are at least three data transfer rates and numerous combinations thereof, which are also referred to as data channels that are supported by the system and defined by their peak rates of 100 kb/s, 10 Mb/s and 500 Mb/s. Of course, other data rates are contemplated and exemplary embodiments are not specifically limited to the data rates disclosed herein. The three data channels are relatively independent and can transfer data at the same time. The three data channels transfer data in a serial bit by bit manner and use dedicated hardware to implement this functionality.

The 100 kb/s data channel, also called the low-speed data communication channel, is distributed within the system electrically and inductively. Similarly to the inductive power transfer, the low speed channel is transferred inductively by modulating a magnetic field across an air gap on the magnetic flux path, from the rail to the accessory and back. The data transfer is almost not affected by the gap size. This makes the communication channel very robust and tolerant to dirt or misalignment. This channel is the NPDS control plane. It is used to control the different accessories and transfer low speed data between the NPDS microprocessors and the accessories. One slot of every three rail slots is dedicated to the low speed communication channel.

The 10 Mb/s data channel, also called the medium-speed data communication channel, is distributed within the system electrically and inductively. It is sharing communication rail slots with the low speed data channels and the data is transferred to the accessories inductively in the same manner. The NPDS is providing the medium speed data channel path from one accessory to another accessory or a soldier tether coupled to the rail, and as it does not terminate at the Master Control Unit (MCU) this allows simultaneous low speed and medium speed communications on the NPDS system. The MCU is capable of switching medium speed communications data from one accessory to another accessory. When the communication slot is in medium speed mode then all of the related circuit works at a higher frequency and uses different transmission path within the system. The low or medium speed communication channel functionality can be selected dynamically.

The 500 Mb/s data channel, also called the high-speed data communication channel, is distributed within the system electrically and optically. It is using a dedicated optical data port at the beginning of the rail (e.g., closest to the pistol grip). The high-speed data channel is transferred optically between optical data port and the accessories. Similarly to the medium speed channel, NPDS is providing the high-speed data channel path from an accessory to the soldier tether, and as it does not terminate at the Master Control Unit (MCU) this allows simultaneous low speed, medium speed and high speed communications on the NPDS system.

Figure 13B:
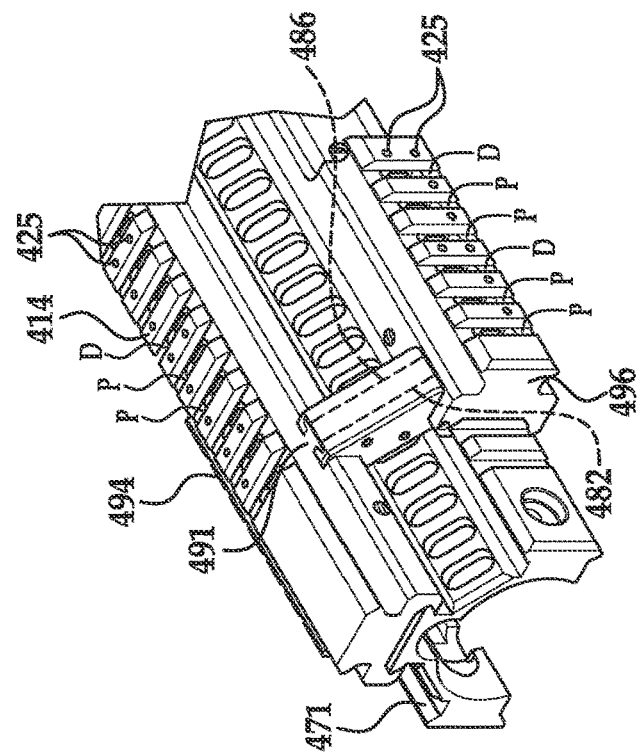
FIGS. 13A and 13B are perspective views of an upper receiver with rails of the networked powered data system (NPDS) mounted thereto.
Figure 13A:
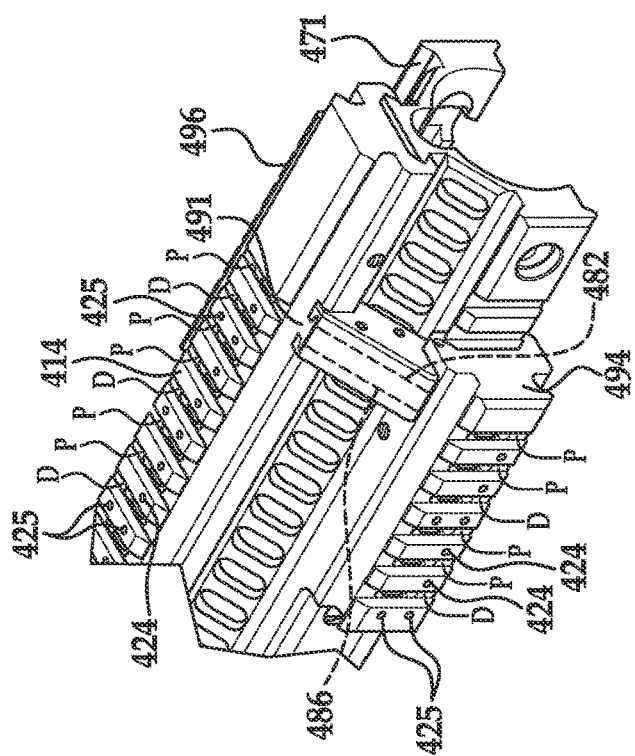
Figure 13D:
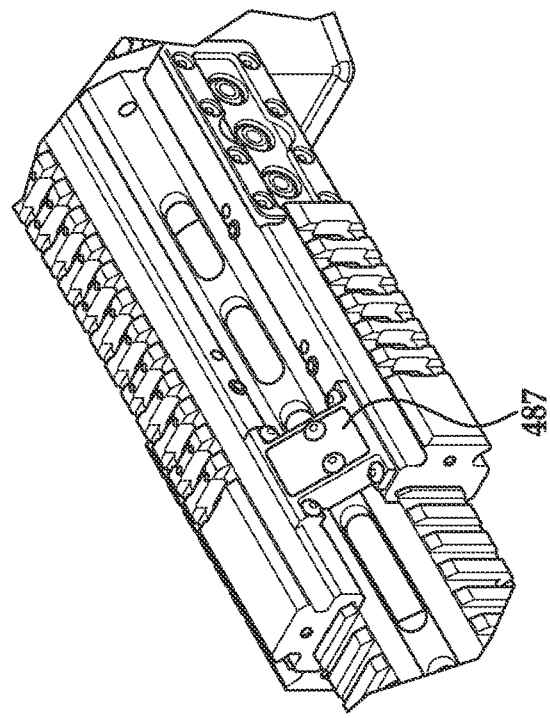
FIGS. 13C and 13D illustrate alternative embodiments of the upper receiver illustrated in FIGS. 13A and 13B.
Figure 13C:
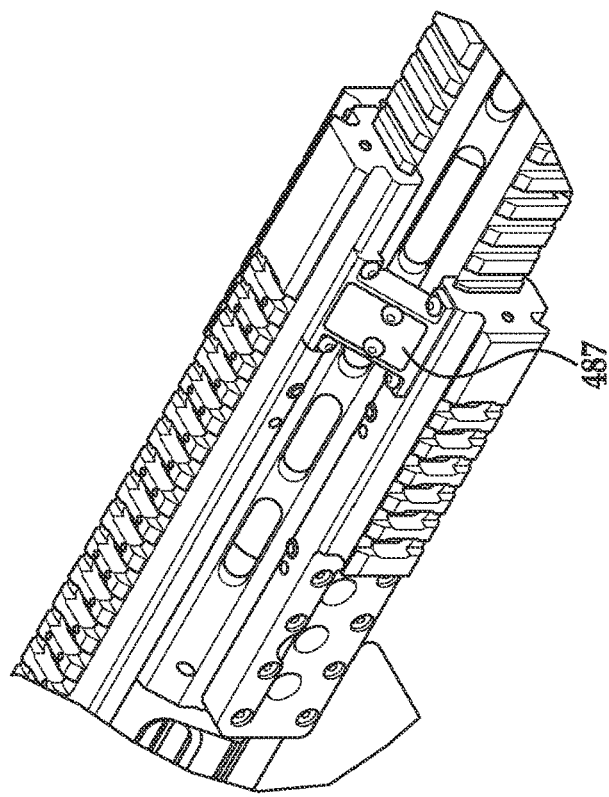

FIGS. 13A and 13B illustrate a front end of an upper receiver 471 showing an upper inductive/data rail 414 and side accessory inductive/data rails 494 and 496 wherein the side accessory inductive/data rails 494 and 496 are directly wired to upper inductive/data rail 414 via wires 486 and 482 that are located within bridges 487 fixedly secured to the upper receiver so that wires 486 and 482 are isolated and protected from the elements. Thus, the bridges provide a conduit of power 482 and data 486 from the top rail to the side rails (or even a bottom rail not shown). Bridges 487 are configured to engage complimentary securement features 491 located on rails 414, 494 and 496 or alternatively upper receiver 471 or a combination thereof. In addition, the bridges will also act as a heat dissipater. In one embodiment, the bridges are located towards the end of the rail closest to the user. The gun barrel is removed from this view for clarity purposes. FIGS. 13C and D illustrate alternative configurations of the rail bridges 487 illustrated in FIGS. 13A and 13B.

Figure 14A:
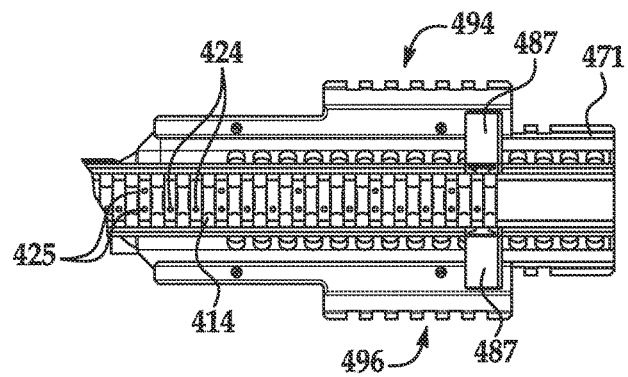
FIGS. 14A and 14B are perspective views of rails of the networked powered data system (NPDS)
Figure 14B:
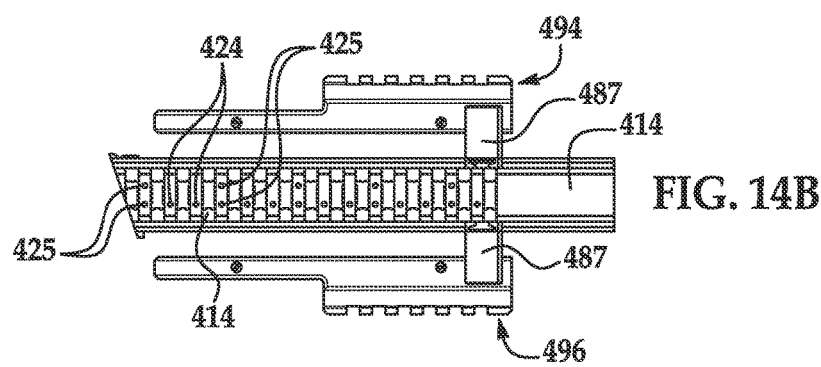
Figure 14C:
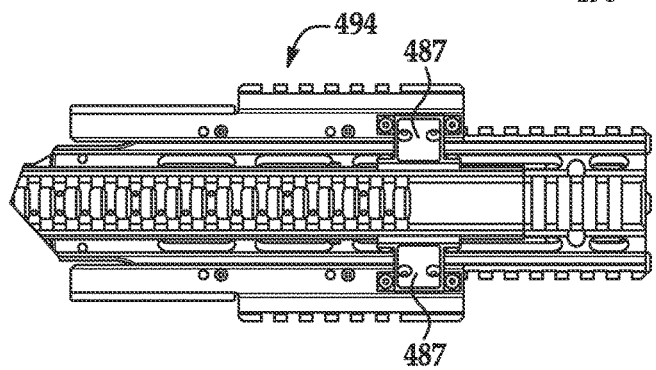
FIGS. 14C and 14D illustrate alternative embodiments of the rails illustrated in FIGS. 14A and 14B.
Figure 14D:
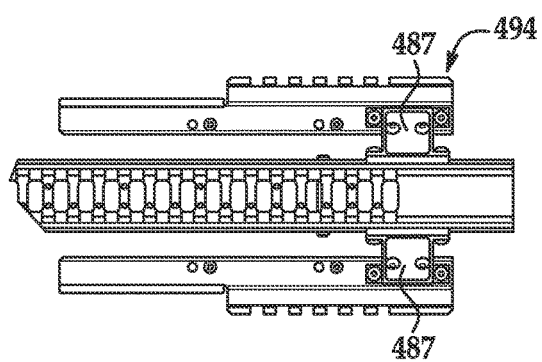

FIG. 14A is a top view of the upper receiver 471 with the upper inductive/data rail 414 and side accessory inductive/data rails 494 and 496 while FIG. 14B is a top view of the upper receiver 471 with the upper inductive/data rail 414 and side accessory inductive/data rails 494 and 496 without the upper receiver. FIGS. 14C and 14D illustrate alternative configurations of the rail bridges 487 and the rail 494 illustrated in FIGS. 14A and 14B.

Figure 15A:
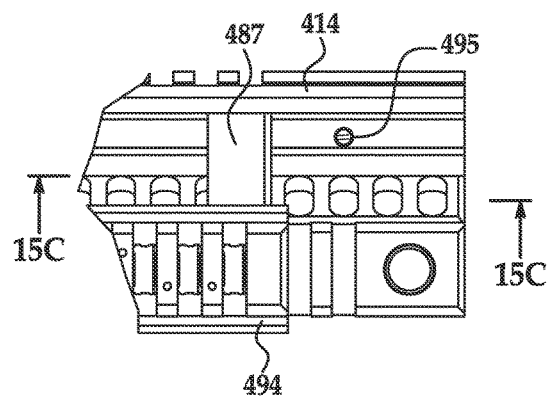
FIGS. 15A-15C illustrate the mounting an the rails of the networked powered data system (NPDS)
Figure 15B:
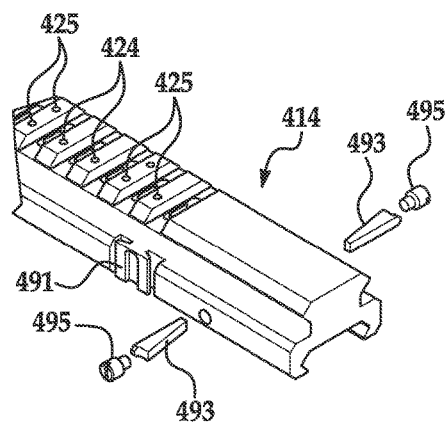
Figure 15C:
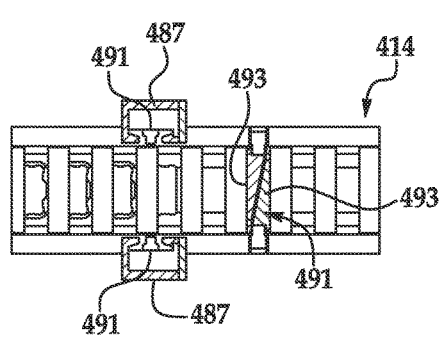

Referring now to FIGS. 15A-15B an apparatus and method for securing and positively locking the inductive/data rail (e.g., upper, side or bottom) to the existing rail 412 of the upper receiver 471. Here, an expanding wedge feature 491 comprising a pair of wedge members 493 is provided. To secure rail 414 to rail 412 each wedge member is slid into a slot of the rail axially until they contact each other and the sliding contact causes the surface of the wedge members to engage a surface of the slot. In order to axially insert the wedge members, a pair of complimentary securement screws 495 are used to provide the axial insertion force as they are inserted into the rail by engaging a complimentary threaded opening of the rail 414, wherein they contact and axially slide the wedge members 493 as the screw is inserted into the threaded opening.

Figure 15D:
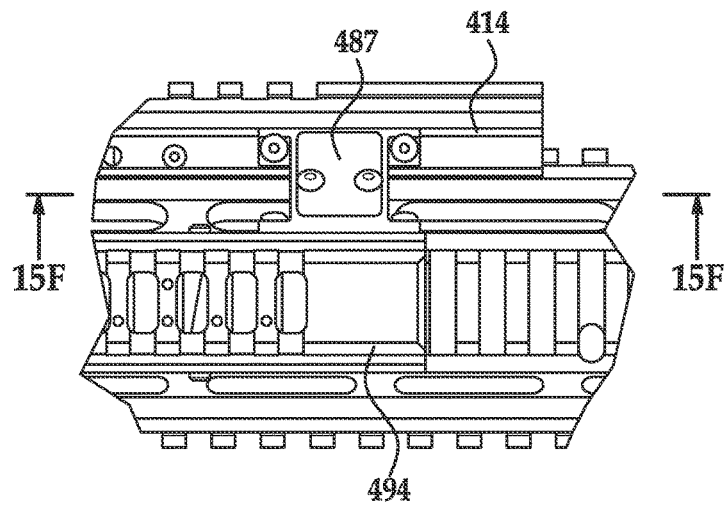
FIGS. 15D-15F illustrate alternative embodiments of the rails illustrated in FIGS. 15A-15C.
Figure 15E:
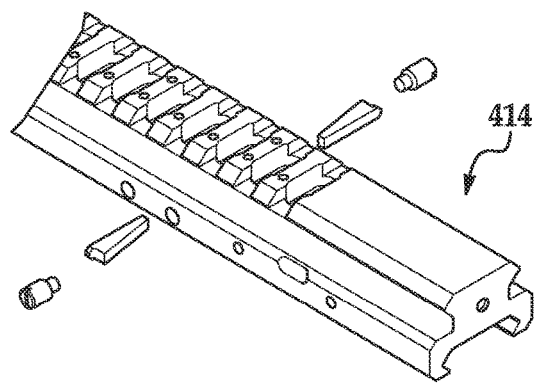
Figure 15F:
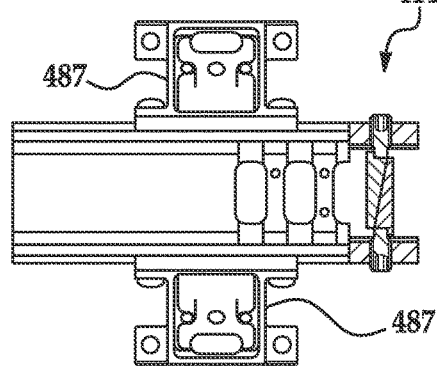

Referring now to FIGS. 15D-F, alternative non-limiting configurations of bridges 487 are illustrated, in this embodiment, bridges 487 are attached to the rails by a mechanical means such as screws or any other equivalent device.

Figure 16:
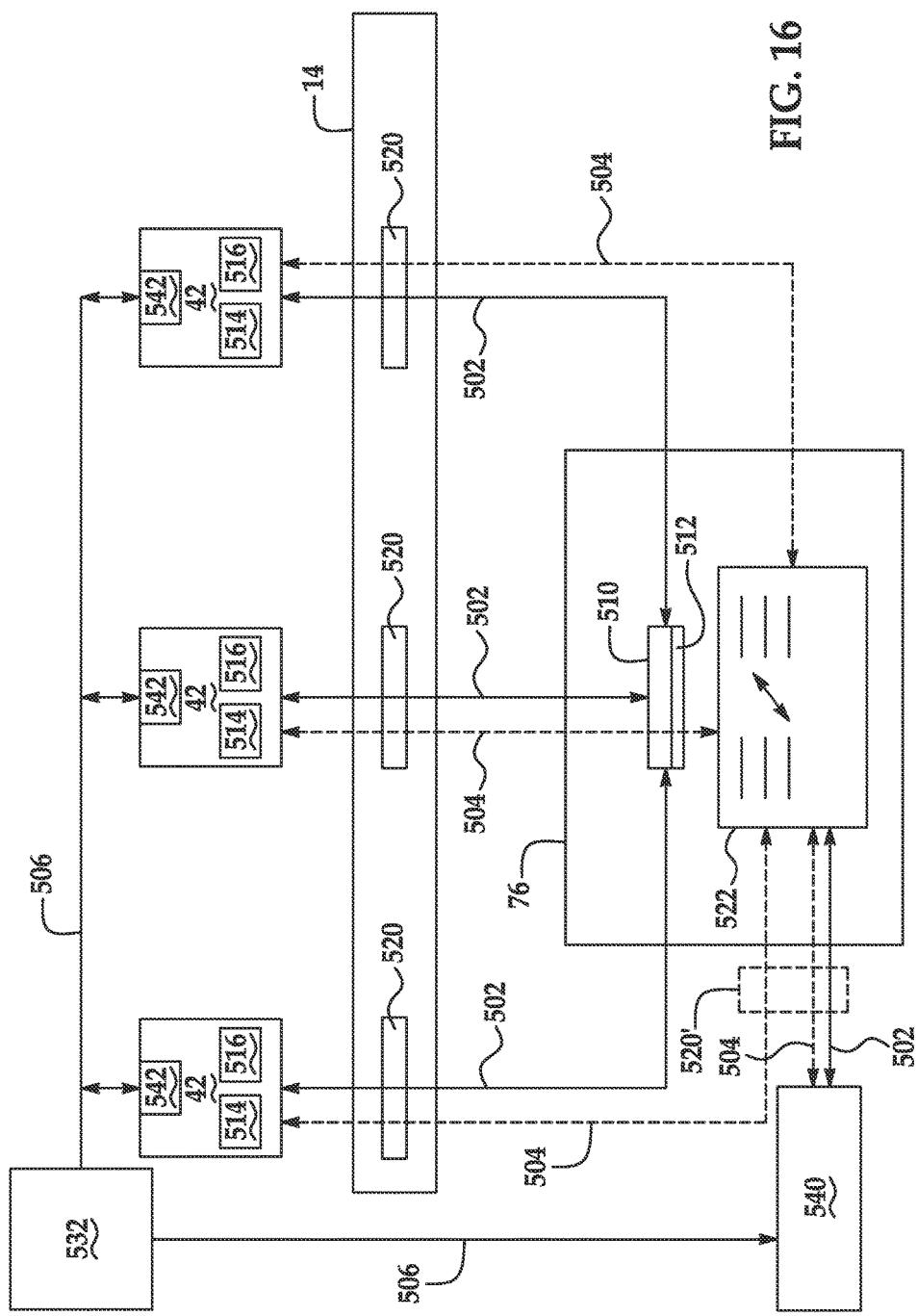
FIG. 16 is schematic illustration of power and data transfer between components of the networked powered data system (NPDS)

With reference now to FIG. 16, as discussed generally above the accessories 42 and the master CPU 76 can communicate with one another in several different manners. For example, and as also described above, the master CPU 76 can vary the frequency that power or another signal is provided to the accessories 42 to provide information (data) to them. Similarly, the accessories 42 can communicate data to the master CPU 76 by utilizing load modulation. As discussed above, such communication can occur on the same cores (referred to below as "core pairs") as are used to provide power or can occur on separate coils. Indeed, as described above, in one embodiment, one in every three coils is dedicated to data transmission.

FIG. 16 illustrates three different communication channels shown as a low speed channel 502, a medium speed channel 504 and a high speed channel 506. The low speed channel 502 extends from and allows communication between the master CPU 76 and any of the accessories 42. The low speed channel 502 can be driven by a low speed transmitter/receiver 510 in the master CPU 76 that includes selection logic 512 for selecting which of the accessories 42 to route the communication to.

Each accessory 42 includes low speed decoding/encoding logic 514 to receive and decode information received over the low speed channel 502. Of course, the low speed decoding/encoding logic 514 can also include the ability to transmit information from the accessories 42 as described above.

In one embodiment, the low speed channel 502 carries data at or about 100 kB/s. Of course, other speeds could be used. The low speed channel 502 passes through an inductive coil pair 520 (previously identified as primary coil 26 and secondary coil 50 hereinafter referred to as inductive coil pair 520) between each accessory 42 and the master CPU 76. It shall be understood, however, that the inductive coil pair could be replaced include a two or more core portions about which the coil pair is wound. In another embodiment, the cores can be omitted and the inductive coil pair can be implemented as an air core transformer. As illustrated, the inductive coil pairs 520 are contained within the inductive powering rail 14. Of course and as illustrated in the previous embodiments, one or more of the coils included in the inductive coil pairs 520 can be displaced from the inductive powering rail 14.

The medium speed channel 504 is connected to the inductive coil pairs 520 and shares them with low speed channel 502. For clarity, branches of the medium speed channel 504 as illustrated in dashed lines. As one of ordinary skill will realize, data can be transferred on both the low speed channel 502 and the medium speed channel at the same time. The medium speed channel 504 is used to transmit data between the accessories 42.

Both the low and medium speed channels 502, 504 can also be used to transmit data to or receive data from an accessory (e.g. a tether) not physically attached to the inductively powering rail 14 as illustrated by element 540. The connection between the master CPU 76 can be either direct or though an optional inductive coil pair 520'. In one embodiment, the optional inductive coil pair 520' couples power or data or both to a CPU located in or near a handle portion of a gun.

To allow for communication between accessories over the medium speed channel 504, the master CPU 76 can include routing logic 522 that couples signals from one accessory to another based on information either received on the medium speed channel 504. Of course, in the case where two accessories coupled to the inductively powering rail 14 are communicating via the medium speed channel 502, the signal can be boosted or otherwise powered to ensure is can drive the inductive coil pairs 520 between the accessories.

In another example, the accessory that is transmitting the data first utilizes the low speed channel 502 to cause the master CPU 76 to set the routing logic 522 to couple the medium speed channel 504 to the desired receiving accessory. Of course, the master CPU 76 itself (or an element coupled to it) can be used to separate low and medium speed communications from one another and provide them to either the low speed transmitter/receiver 510 or the routing logic 522, respectively. In one embodiment, the medium speed channel 504 carries data at 10 MB/s.

FIG. 16 also illustrates a high speed channel 506. In one embodiment, the high speed channel 506 is formed by an optical data line and runs along at least a portion of the length of the inductively powering rail 14. For clarity, however, the high speed channel 506 is illustrated separated from the inductively powering rail 14. Accessories 42 can include optical transmitter/receivers 542 for providing signals to and receiving signals from the high speed channel 506. In one embodiment, a high speed signal controller 532 is provided to control data flow along the high speed channel 506. It shall be understood that the high speed signal controller 532 can be located in any location and may be provided, for example, as part of the master CPU 76. In one embodiment, the high speed signal controller 532 is an optical signal controller such as, for example, an optical router.

Figure 17:
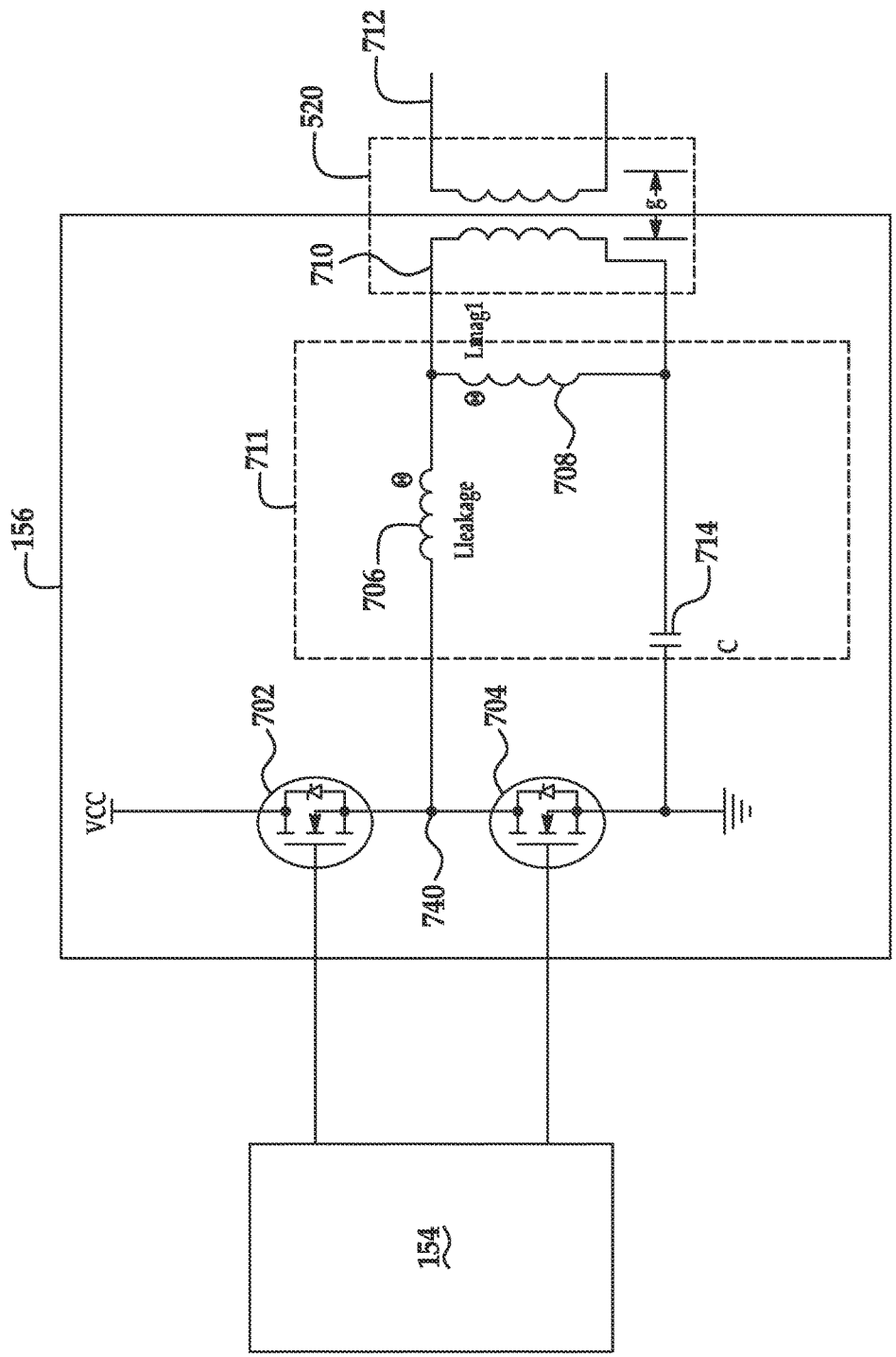
FIG. 17 is schematic illustration of a circuit for inductive power transfer in accordance with one exemplary embodiment of the present invention.
Figure 18A:
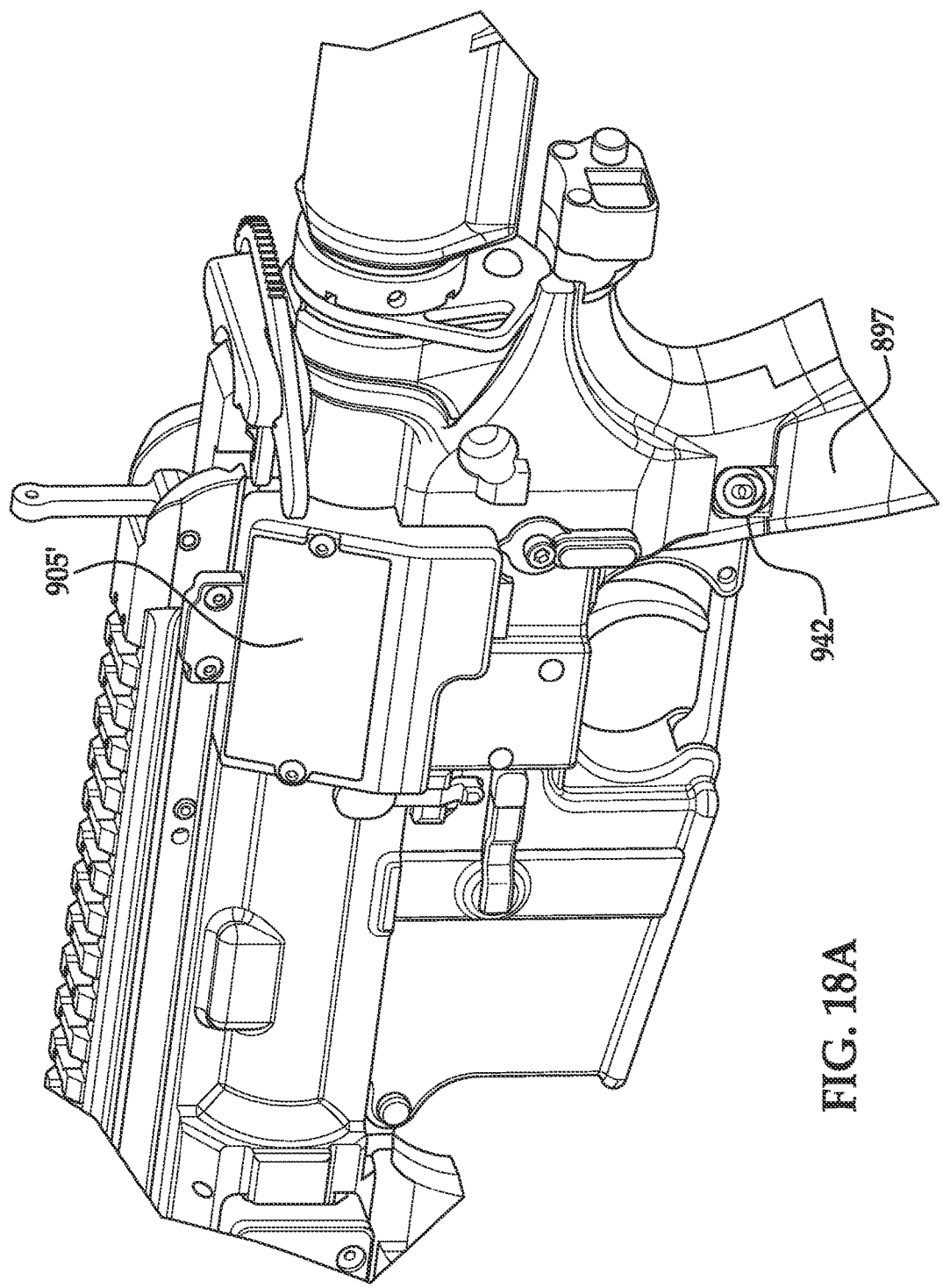
FIG. 18A is a perspective view of a portion of a weapon with the networked powered data system (NPDS) according to an alternative embodiment of the present invention.
Figure 20D:
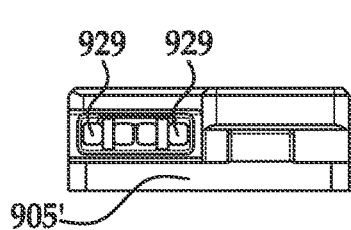
Figure 20E:
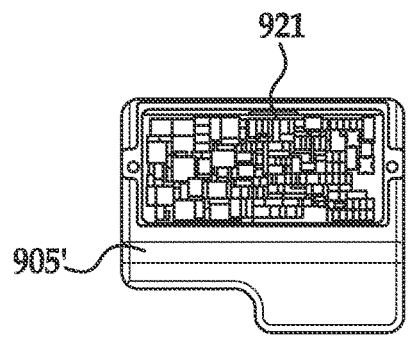
Figure 20F:
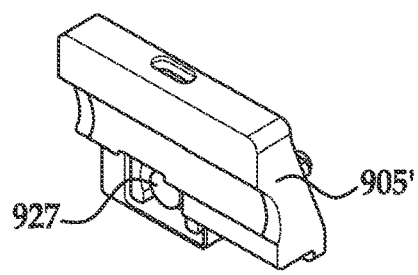

FIG. 17 illustrates an example of the MOSFET driver 154 coupled to MOSFET and transformer circuitry 156. In general, the MOSFET driver 154 the MOSFET and transformer circuitry 156 to produce an alternating current (AC) output at an output coil 710. The AC output couples power to a receiving coil 712. As such, the output coil 710 and the receiving coil 712 form an inductive coil pair 520. In one embodiment, the receiving coil 712 is located in an accessory as described above.

It shall be understood that it is desirable to achieve efficient power transfer from the output coil 710 to the receiving coil 712 (or vice versa). Utilizing the configuration shown in FIG. 17 has led, in some instances, to a power transfer efficiency of greater than 90%. In addition, it shall be understood, that the accessory could also include such a configuration to allow for power transfer from the receiving coil 712 to the output coil 710. The illustrated MOSFET and transformer circuitry 156 includes an LLC circuit 711 that, in combination with the input and output coils, forms an LLC resonant converter. The LLC circuit 711 includes, as illustrated, a leakage inductor 706, a magnetizing inductor 708 and a capacitor 714 serially connected between input node 740 and ground. The magnetizing inductor 708 is coupled in parallel with the output coil 710. The operation and location of the first and second driving MOSFET's 702, 704 is well known in the art and not discussed further herein. In one embodiment, utilizing an LLC resonant converter as illustrated in FIG. 17 can lead to increased proximity effect losses due to the higher switching frequency, fringe effect losses due to the presence of a gap, an effective reverse power transfer topology, and additional protection circuits due to the unique nature of the topology.

In one embodiment, the MOSFET's 702, 704 are switched at the second resonant frequency of the resonant LLC resonant converter. In such a case, the output voltage provided at the output coil 710 is independent of load. Further, because the second resonant frequency is dominated by the leakage inductance and not the magnetizing inductance, it also means that changes in the gap size (g) do little to change the second resonant point. As is known in the art, if the LLC resonant converter is above the second resonant point, reverse recovery losses in rectifying diodes in the receiving device (not illustrated) are eliminated as the current through the diode goes to zero when they are turned off. If operated below the resonant frequency, the RMS currents are lower and conduction losses can be reduced which would be ideal for pure resistive loads (i.e.: flash light). However, operating either above or below the second resonant point lowers the open loop regulation, so, in one embodiment, it may be desirable to operate as close as possible to the second resonant point when power a purely resistive load (e.g., light bulb) or rectified load (LED).

The physical size limitations of the application can lead to forcing the resonant capacitor 714 to be small. Thus, the LLC resonant converter can require a high resonant frequency (e.g., 300 kHz or higher). Increased frequency, of course, leads to increased gate drive loss at the MOSFET's 702, 704. To reduce these effects, litz wire can be used to connect the elements forming the LLC circuit 711 and in the coils 710, 712. In addition, it has been found that utilizing litz wire in such a manner can increase gap tolerance.

The increased gap tolerance, however, can increase fringe flux. Fringe flux from the gap between the cores around which coils 710 and 712 are wound can induce conduction losses in metal to the cores. Using litz wire can combat the loss induced in the windings. However, a means of reducing the loss induced in the rails is desirable. This can be achieved by keeping the gap away from the inductively coupling rail, creating a gap spacer with a distributed air gap that has enough permeability to prevent flux fringing, or by adding magnetic inserts into the rail to prevent the flux from reaching the aluminum.

Referring now to FIG. 18, portions of an upper receiver and a lower receiver equipped with the inductive power and data transferring rail are illustrated. As illustrated, the pistol grip 897 is configured to have a rear connector 899 configured for a sling tether 501 to transmit power and bi-directional data from an external soldier system 540 coupled to the tether.

As illustrated, the pistol grip is configured to support the rear power/data connector for the sling tether. In addition, a portion 905 of the pistol grip is reconfigured to wrap up around the top of the upper receiver to provide a supporting surface for buttons 907 to control (on/off, etc) the accessories mounted on the rails. In one embodiment, the buttons will also be provided with haptic features to indicate the status of the button or switch (e.g., the buttons will vibrate when depressed).

Portion 905 also includes a pair of coils 909 for inductively coupling with another pair of coils on the lower receiver (not shown). In one non-limiting exemplary embodiment, the inductive cores will be an EQ20/R core commercially available from Ferroxcube. Further information is available at the following website http://www.ferroxcube.com/prod/assets/eq20r.pdf and in particular FIG. 1 found at the aforementioned website. A circuit board will have a coil pattern and the EQ20/Rcores will be cut into the middle of the circuit board.

Accordingly, portion 905 provides a means for coupling between the upper and lower receiver to transmit power and data to and from the rails. As such, data from a microprocessor or other equivalent device resident upon the upper receiver can be transferred to a microprocessor or other equivalent device resident upon the lower receiver. In addition, power may be transferred between the upper receiver and lower receiver via inductive coupling. FIGS. 19A-19D illustrate views of portion 905 for coupling the upper receiver portion to the lower receiver wherein the coupling has features 911 for receipt of the cores therein.

In addition and referring now to FIG. 18 one of the optical transmitters/receivers 542 is located at the rear portion of the rail for optical communication with a complimentary optical transmitter/receiver 542 located on the accessory (See at least FIG. 16). As illustrated, the optical transmitter/receiver 542 is coupled to a fiber optic wire or other data communication channel 506 that is coupled to another optical transmitter/receiver 542' that communicates with an optical transmitter/receiver 542' located on the lower receiver and is coupled to the rear connector 899 via a fiber optic wire or other data communication channel 506 located within the lower receiver.

Accordingly and as illustrated schematically in at least FIGS. 16 and 18 is that portion 905 allows data and power transfer between the upper receiver and the lower receiver via the coils of the upper receiver and the lower receiver while also allowing the upper receiver to be removed from the lower receiver without physically disconnecting a wire connection between the upper and lower receiver. Similarly and in the embodiment where the high speed channel is implemented the optical transmitter/receivers 542' allow the upper receiver to be removed from the lower receiver without physically disconnecting a wire connection between the upper and lower receiver. Also shown in FIG. 18 is that a rear sight 919 is provided at the back of the NPDS rail.

Referring now to FIGS. 18A and 20A-F, an alternative configuration of portion 905, illustrated as 905', is provided. As mentioned above, portion 905' provides a means for providing the inductive method of bi-directionally transferring power and data from the upper receiver to the lower receiver. In this embodiment, 905' is an appendage of the upper receiver. Portion 905' has a housing configured to receive a circuit board 921 and associated electronics required for data and power communication. Once the circuit board 921 is inserted therein it is covered by a cover 923. In one embodiment, cover 923 is secured to the housing of portion 905' by a plurality of screws 925. Of course, any suitable means of securement is contemplated to be within the scope of exemplary embodiments of the present invention.

In this embodiment, portion 905' is configured to have a power core 927 and a pair of data cores 929. As illustrated, the power core 927 is larger than the smaller two data cores 929. Portion 905' is configured to interface with the pistol grip 897 such that as the two are aligned, portion 905' locks or wedges into complementary features of the pistol grip 897 such that the pistol grip is secured thereto and the power and data cores (927 and 929) are aligned with complementary power and data cores located in the pistol grip 897. Accordingly and in this embodiment, the pistol grip 897 will also have a pair of data cores and a power core matching the configuration of those in portion 905'.

In this embodiment, the smaller data cores 929 and those of the pistol grip can be configured for low speed data (100 kbps) and medium speed data (10 Mbps) at the same time. Of course, the aforementioned data transfer rates are merely provided as examples and exemplary embodiments of the present invention contemplate ranges greater or less than the aforementioned values.

Figure 21:
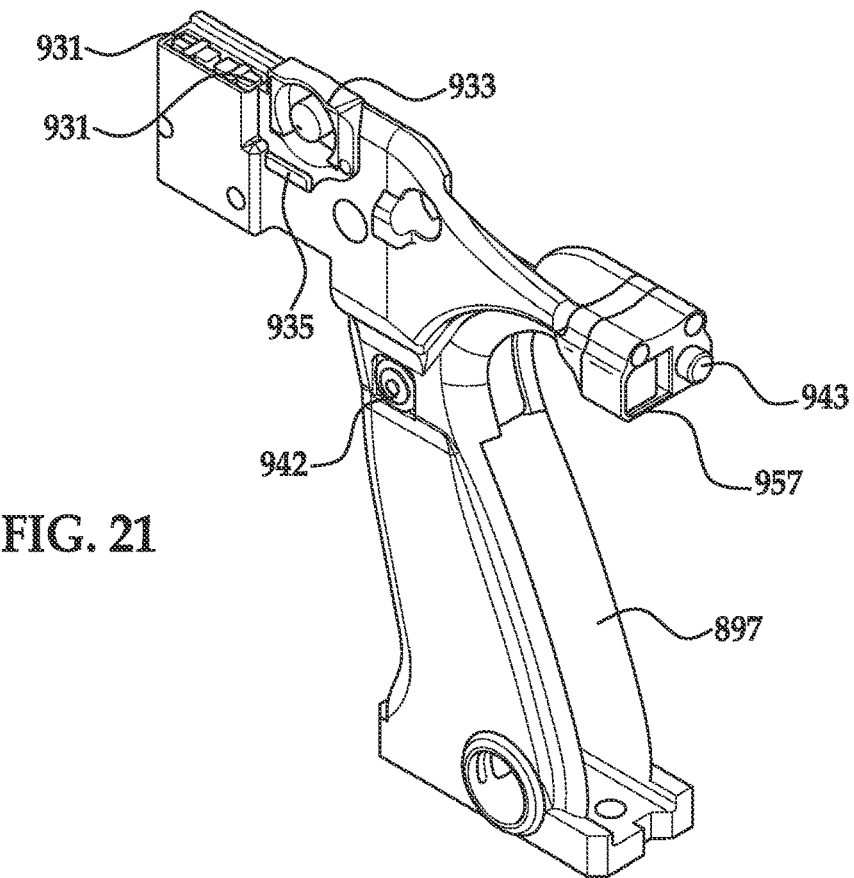
FIG. 21 is a perspective view of a pistol grip for use with the upper receiver illustrated in FIG. 18A.

FIG. 21 illustrates a portion of a pistol grip 897 contemplated for use with portion 905'. As illustrated, a pair of complementary data cores 931 and a complimentary power core 933 are configured and positioned to be aligned with portion 905' and its complementary cores (data and power) when portion 905' is secured to pistol grip 897 such that inductive power and data transfer can be achieved. In one non-limiting embodiment, pistol grip 897 has a feature 935 configured to engage a portion of portion 905' wherein feature 935 is configured to assist with the alignment and securement of portion 905' to the pistol grip 897.

Figure 22:
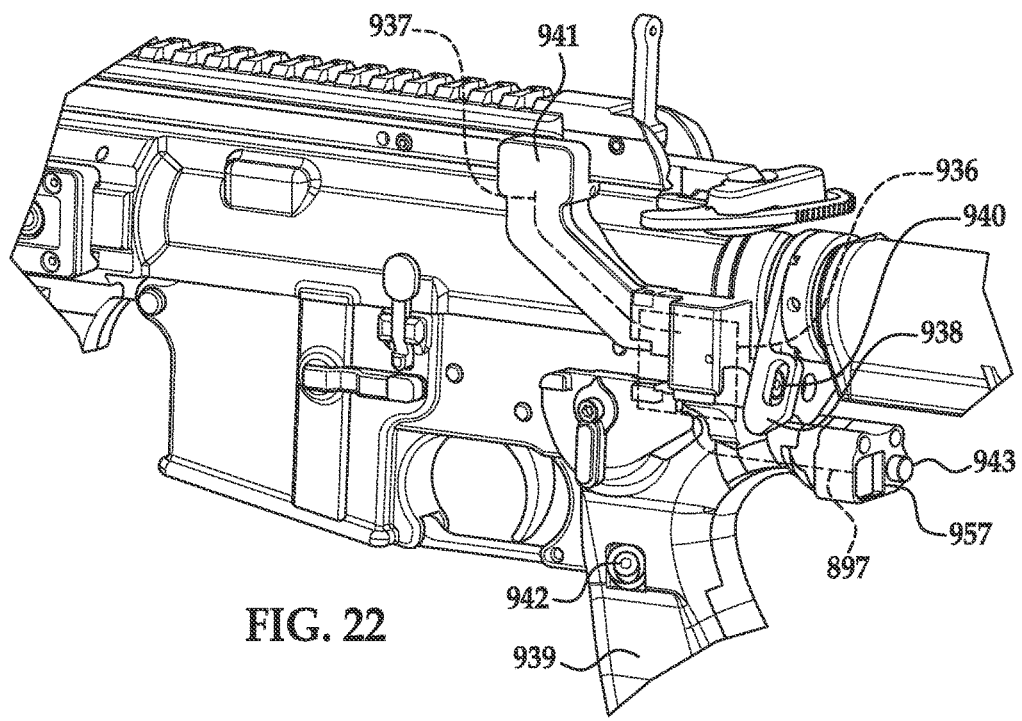
FIG. 22 is a perspective view of a portion of a weapon with the networked powered data system (NPDS) according to another alternative embodiment of the present invention.
Figure 23:
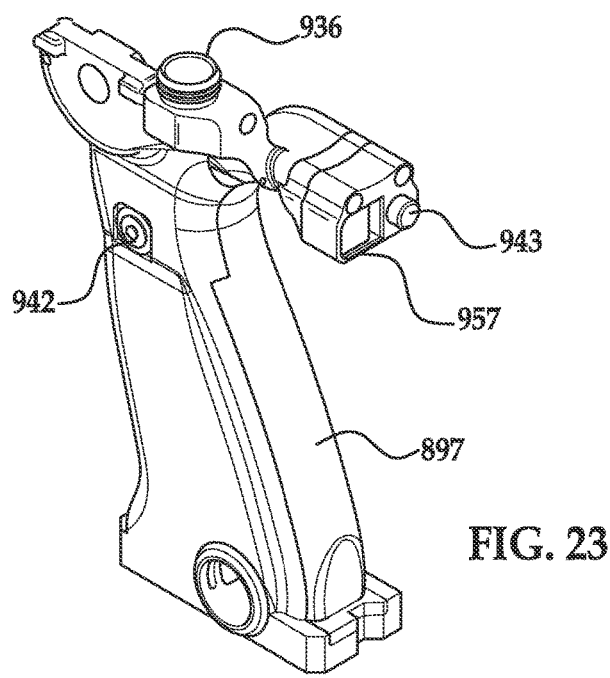
FIG. 23 is a perspective view of a pistol grip for use with the upper receiver illustrated in FIG. 22.

Referring now to FIGS. 22 and 23 yet another alternative method of bi-directionally transferring power and data from the upper receiver to the lower receiver is illustrated. In this embodiment, conductive data and power transmission is achieved through a connector such as a cylindrical connector 936. In this embodiment, a generic connector 936 (comprising in one embodiment a male and female coupling) couples a conduit or cable 937 (illustrated by the dashed lines in FIG. 22) of the upper receiver to a complementary conduit or cable 939 of the lower receiver (also illustrated by dashed lines in FIG. 22), when the upper receiver is secured to the lower receiver. One non-limiting embodiment of such a connector is available from Tyco Electronics.

In order to provide this feature the upper receiver is configured to have an appendage 941 that provides a passage for the cable 937 from the upper rail to the joining cylindrical connector 936. Similar to portion 905 and 905' the appendage 941 is configured to lock and secure the pistol grip 897 to the upper receiver to align both halves of the cylindrical connector 936 (e.g., insertion of male/female pins into each other).

In this embodiment, the sling attaching plate 938 of the lower receiver portion, has a common screw 940 to secure the pistol grip to the upper receiver to ensure alignment of both halves of the cylindrical connector.

Also shown is a control button 942 (for control on/off, etc. of various accessories mounted on the rails or any combination thereof) that is positioned on both sides the pistol grip 897. In one non-limiting embodiment, the control button is configured to act as a switch for a laser accessory mounted to the weapon. The control button is found in both the conductive and inductive pistol grip configurations and is activated by the side of an operator's thumb. Requiring side activation by a user's thumb prevents inadvertent activation of the control button when handling the grip 897. In other words, control button 942 requires a deliberate side action of the thumb to press the control button 942.

In order to provide a means for turning on/off the entire system of the NPDS or the power supply coupled thereto an on/off button or switch 943 is also located on the pistol grip 897.

In addition and referring now to FIG. 24, a power pack or battery 945 is shown attached to pistol grip 897. In this embodiment, the battery is coupled to the pistol grip using a conductive attachment similar to the one used for power and data transfer between the upper receiver and the lower receiver via a generic connector (e.g., male/female configuration). Again, one non-limiting example of such a connector is available from Tyco Electronics and could be a similar type connector used in the embodiment of FIGS. 22 and 23. In order to release the battery pack 945 an actuating lever 947 is provided.

FIG. 25 shows an alternative method of fastening a battery pack to the bottom of the pistol grip 897 as well as an alternative method for transferring power/data inductively and bi-directionally. This method uses a power/data rail section 949 that is mounted to the bottom of the pistol grip 897, which in one exemplary embodiment is similar in configuration to the rails used for the upper and lower receivers and accordingly, it is now possible to use the same battery pack at the pistol grip location or at a rail section elsewhere and accordingly, power the system. In addition, the mounting to the bottom of the pistol grip it is also contemplated that the rail can be used to inductively couple the battery pack to the pistol grip as any other side as long as a desired location of the battery pack is achieved.

In addition and since battery pack can be mounted at the pistol grip location or a rail section elsewhere on the weapon, it is now possible to transmitting data to control the battery pack mounted anywhere on the weapon or its associated systems. Such data can be used to control the power supply and the data as well as power, can be inductively transmitted between the battery pack or power supply and the component it is coupled to. Accordingly, the controller or central processing unit of the Network Powered Data System (NPDS) can determine and choose which battery pack would be activated first (in the case of multiple battery pack secured to the system) based upon preconfigured operating protocol resident upon the controller. For example and in one non-limiting embodiment, the forward rail mounted battery pack would be activated first.

For example and referring now to FIG. 26, a non-limiting example of a power system 951 for the Network Powered Data System (NPDS) according to an embodiment of the present invention is illustrated schematically. Here and as illustrated in the previous FIGS. a primary battery pack 945 is secured and coupled to the pistol grip 897 while a secondary power source or battery pack illustrated as 953 is secured to a forward rail of the upper receiver or, of course, any other rail of the weapon. In this embodiment, the secondary battery pack 953 can be a stand alone power supply similar to battery pack 945 or integrated with an accessory mounted to the rail. In one embodiment, secondary battery pack 953 is of the same size and configuration of primary battery pack 945 or alternatively may have a smaller profile depending on the desired location on the weapon. Secondary battery pack 953 can be utilized in a similar fashion as the primary battery pack 945 due to the reversible power capability of the rails as discussed above.

Still further, yet another source of power 955 also controlled by the system may be resident upon a user of the weapon (e.g., power supply located in a back pack of a user of the weapon) wherein an external power/data coupling is provided via coupling 957 located at the rear of the pistol grip 897 (See at least FIGS. 21-23). In all cases both power and data are transmitted as the master control unit (MCU) of the NPDS communicates with the power sources (e.g., primary 945, secondary 953 and external 955) and thus the MCU controls all the power supplies of the power system.

One advantage is that the system will work without interruption if for example, the primary battery pack 945 is damaged or suddenly removed from pistol grip 897 or rail 414 as long as an alternative power connection (e.g., 953, 955) is active. Connection of the primary battery pack 945 or other power source device will also ensure that the rails are powered if the pistol grip 897 is damaged or completely missing including the CPU. For example and in one implementation, the default configuration of the rails will be to turn power on as an emergency mode.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. In combination, a powered accessory and a rail configured to removably receive and retain the powered accessory;
   an apparatus for inductively providing power and data to the powered accessory, wherein the data is exclusively provided to the powered accessory from one of a plurality of coils located within the rail; and
   wherein the powered accessory further comprises a plurality of coils and the powered accessory is configured to determine when one of the plurality of coils of the powered accessory is adjacent to the one of the plurality of coils of the rail, wherein the data is provided at two different rates.

2. The powered accessory and rail as in claim 1, wherein the rail further comprises:
   a plurality of slots and a plurality of ribs each being located in an alternating fashion on a surface of the rail;
   a first plurality of pins each having an end portion located on a surface of one of a first plurality of the plurality of ribs;
   a second plurality of pins each having a first end portion and a second end portion located on a surface of a second plurality of the plurality of ribs.

3. The powered accessory and rail as in claim 2, wherein each of the second plurality of the plurality of ribs is adjacent to at least two of the first plurality of ribs.

4. The powered accessory and rail as in claim 3, further comprising a coil located beneath a bottom surface of each one of the plurality of slots.

5. The powered accessory and rail as in claim 3, wherein an intermediate portion of each of the second plurality of pins is located adjacent to a switch located in the rail.

6. A weapon, comprising:
   an upper receiver;
   a lower receiver;

a powered accessory mounted to a rail of the upper receiver; and an apparatus for inductively providing power and data to the powered accessory, wherein the data is exclusively provided to the powered accessory from one of a plurality of coils located within the rail; and wherein the powered accessory further comprises a plurality of coils and the powered accessory is configured to determine when one of the plurality of coils of the powered accessory is adjacent to the one of the plurality of coils of the rail, wherein the data is provided at two different rates.

7. The weapon as in claim 6, wherein the rail further comprises:

a plurality of slots and a plurality of ribs each being located in an alternating fashion on a surface of the rail;

a first plurality of pins each having an end portion located on a surface of one of a first plurality of the plurality of ribs;

a second plurality of pins each having a first end portion and a second end portion located on a surface of a second plurality of the plurality of ribs.

8. The weapon as in claim 7, wherein each of the second plurality of the plurality of ribs is adjacent to at least two of the first plurality of ribs.

9. The weapon as in claim 8, further comprising a coil located beneath a bottom surface of each one of the plurality of slots.

10. The weapon as in claim 8, wherein an intermediate portion of each of the second plurality of pins is located adjacent to a switch located in the rail.

\* \* \* \* \*